(12) United States Patent
Morrow

(10) Patent No.: US 7,140,461 B2
(45) Date of Patent: Nov. 28, 2006

(54) POWER SPLITTING VEHICLE DRIVE SYSTEM

(75) Inventor: Jon J. Morrow, Neenah, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 315 days.

(21) Appl. No.: 10/723,926

(22) Filed: Nov. 26, 2003

(65) Prior Publication Data

US 2005/0109549 A1 May 26, 2005

(51) Int. Cl.
*B60K 6/04* (2006.01)

(52) U.S. Cl. .................... 180/65.2; 180/65.6
(58) Field of Classification Search ............. 180/65.1, 180/65.2, 65.3, 65.4, 65.6; 903/926
See application file for complete search history.

(56) References Cited

U.S. PATENT DOCUMENTS

| | | | | |
|---|---|---|---|---|
| 5,586,613 A | | 12/1996 | Ehsani | |
| 5,927,417 A | * | 7/1999 | Brunner et al. | 180/65.6 |
| 5,935,035 A | * | 8/1999 | Schmidt | 475/5 |
| 6,041,877 A | * | 3/2000 | Yamada et al. | 180/65.2 |
| 6,135,914 A | * | 10/2000 | Yamaguchi et al. | 477/3 |
| 6,306,056 B1 | * | 10/2001 | Moore | 475/5 |
| 6,387,007 B1 | * | 5/2002 | Fini, Jr. | 475/268 |
| 6,557,656 B1 | * | 5/2003 | Haniu et al. | 180/65.6 |
| 6,578,648 B1 | * | 6/2003 | Bell | 180/24.11 |
| 6,691,809 B1 | * | 2/2004 | Hata et al. | 180/65.3 |

* cited by examiner

*Primary Examiner*—Christopher P. Ellis
*Assistant Examiner*—Brian Swenson
(74) *Attorney, Agent, or Firm*—Foley & Lardner LLP

(57) ABSTRACT

A vehicle includes a prime mover, a first output shaft, a second output shaft and a planetary gear assembly. The planetary gear assembly includes a sun gear, a ring gear and a plurality of planetary gears supported between the ring gear and the sun gear by a carrier. One of the sun gear and the ring gear is coupled to the prime mover. The other of the ring gear and the sun gear is coupled to the first output shaft. The first carrier is coupled to the second output shaft.

75 Claims, 13 Drawing Sheets

POWER SPLITTING VEHICLE DRIVE SYSTEM

CROSS REFERENCE TO RELATED APPLICATIONS

The present application is related to co-pending U.S. patent application Ser. No. 10/137,585 filed on May 2, 2002 by Jon J. Morrow and Christopher K. Yakes and entitled HYBRID VEHICLE WITH COMBUSTION ENGINE/ELECTRIC MOTOR GUIDE, the full disclosure of which is hereby incorporated by reference.

FIELD OF THE INVENTION

The present invention generally relates to a drive system for a vehicle. In particular, the present invention relates to a work vehicle splitting power between a first output shaft and a second output shaft.

BACKGROUND OF THE INVENTION

Most of today's heavy work vehicles require all-wheel drive. Such all-wheel drive vehicles typically include standard vehicle differential for splitting power between multiple axles of the vehicle and a distinct transfer case for providing speed reduction to achieve the generally high required torques. Such multiple components increase the cost and the weight of the work vehicle.

SUMMARY OF THE INVENTION

According to a first aspect of the present invention, a vehicle includes a prime mover, a first output shaft, a second output shaft and a planetary gear assembly. The planetary gear assembly includes a sun gear, a ring gear and a plurality of planetary gears supported between the ring gear and the sun gear by a carrier. One of the sun gear and the ring gear is coupled to the prime mover. The other of the ring gear and the sun gear is coupled to the first output shaft. The first carrier is coupled to the second output shaft.

According to a second aspect of the present invention, a drive system includes a prime mover, a first output shaft, a second output shaft and a planetary gear assembly. The planetary gear assembly includes a sun gear, a ring gear and a plurality of planetary gears supported between the ring gear and the sun gear by a carrier. One of the sun gear and the ring gear is coupled to the prime mover. The other of the ring gear and the sun gear is coupled to the first output shaft. The carrier is coupled to the second output shaft.

According to a third aspect of the present invention, a vehicle includes an internal combustion engine, a first motor/generator, a second motor/generator, at least one first axle, a first output shaft coupled to the at least one first axle, at least one second axle, a second output shaft coupled to the at least one second axle, a first planetary gear assembly, a drive train and a second planetary gear assembly. The first planetary gear assembly includes a first sun gear, a first ring gear and a first plurality of planetary gears supported between the first ring gear and the first sun gear by a first carrier. The first sun gear is coupled to the first motor/generator. One of the first carrier and the first ring gear is coupled to the engine. The drive train is coupled between the second output shaft and the other of the first carrier and the first ring gear. The second planetary gear assembly includes a second sun gear, a second ring gear and a second plurality of planetary gears supported between the second ring gear and the second sun gear by a second carrier. One of the second ring gear and the second sun gear is coupled to the second motor/generator. The other of the second ring gear and the second sun gear is coupled to the first output shaft. The second carrier is coupled to the second output shaft.

DETAILED DESCRIPTION OF THE PREFERRED EMBODIMENTS

Figure 1:
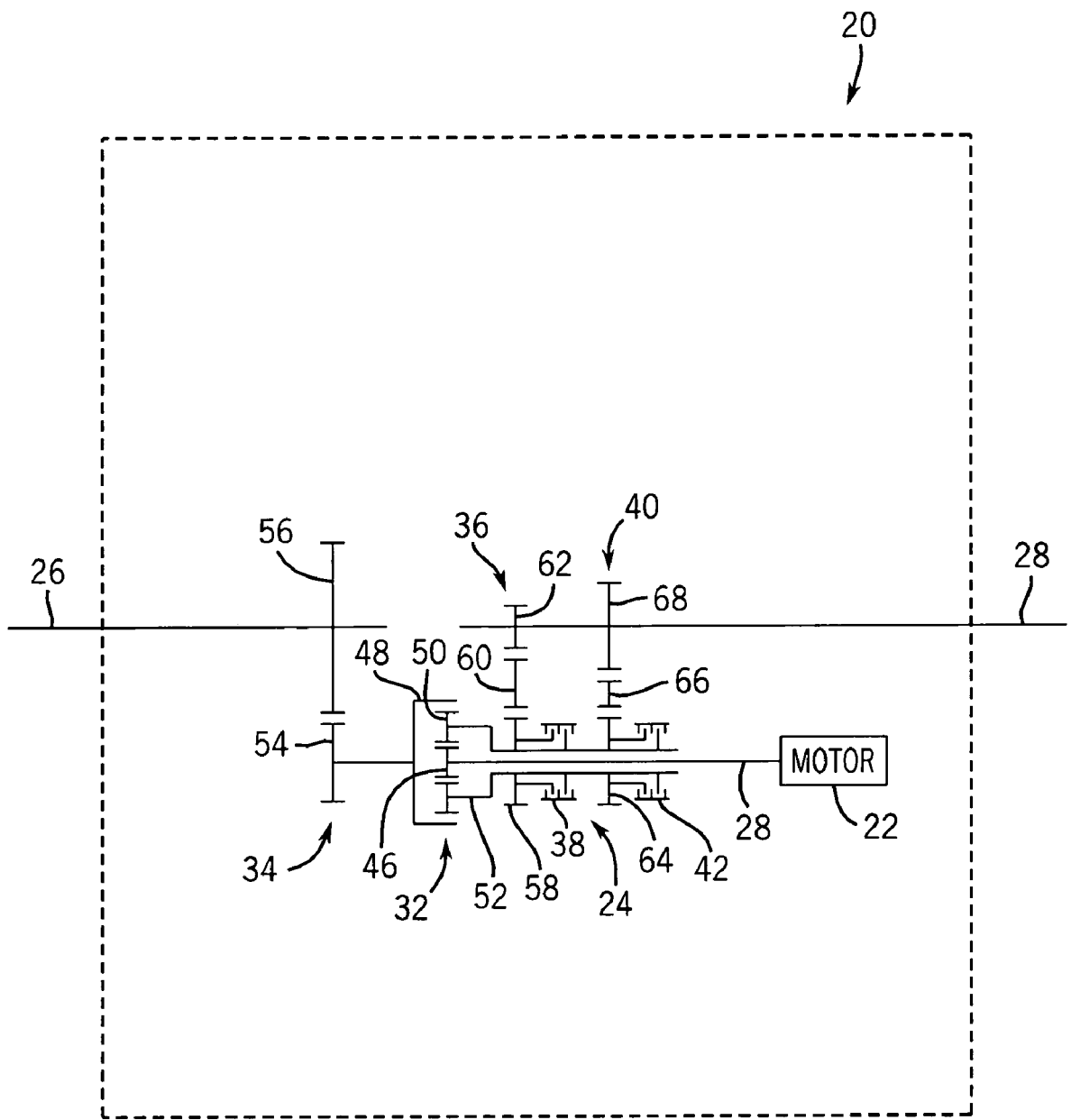
FIG. 1 is a schematic illustration of an example of a drive system of the present invention.

FIG. 1 is a schematic illustration of a drive system 20 which generally includes prime mover 22, distribution system 24, output shaft 26 and output shaft 28. Prime mover 22 generally comprises a source of rotational mechanical energy which is derived from a stored energy source. Examples include, but are not limited to, an internal combustion gas-powered engine, a diesel engine, turbines, fuel cell driven motors, an electric motor or any other type of motor capable of providing rotation of mechanical energy to the prime mover output shaft 28 which is coupled to distribution system 24.

Distribution system 24 is operably coupled between motor 22 and output shafts 26 and 28. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Distribution system 24 is generally configured to distribute rotational mechanical energy or torque to one or both of output shafts 26 and 28.

Distribution system 24 generally includes planetary gear assembly 32, drive train 34, drive train 36, clutch 38, drive train 40 and clutch 42. Planetary gear assembly 32 splits torque from motor 22 between one or more of drive trains 34, 36 and 40 which are coupled to one of output shafts 26 and 28. Planetary gear assembly 32 includes sun gear 46, annular or ring gear 48 and planetary gears 50 rotatably supported by a carrier 52. Sun gear 46 is coupled to output shaft 28 of motor 22 and is in meshing engagement with planetary gears 50. Planetary gears 50 are rotatably supported between sun gear 46 and ring gear 48 by carrier 52 and are in meshing engagement with sun gear 46 and ring gear 48. Ring gear 48 is operably coupled to drive train 34. Carrier 52 is configured to be selectively coupled to at least one of drive trains 36 and 40.

Drive train 34 is coupled to ring gear 48 and generally includes gears 54 and 56 which are in meshing engagement with one another and which are sized or configured to provide appropriate speed reduction of the torque being transmitted to output shaft 26. Although drive train 34 is illustrated as including two intermeshing gears, drive train 34 may alternatively comprise other means for transmitting torque between parallel shafts to effectuate speed reduction. Examples include belt and pulley systems or chain and sprocket systems. In still other embodiments, drive train 34 may be omitted, wherein output shaft 26 is directly coupled to ring gear 48. In still other embodiments, in lieu of output shaft 26 being permanently coupled to ring gear 48, a clutch or other similar mechanism may be employed to allow selective coupling of ring gear 48 to output shaft 26.

Drive train 36 and drive train 40 are configured to transmit torque from carrier 52 to output shaft 28 and to further provide speed reduction of the torque being transmitted. Drive train 36 includes gears 58, 60 and 62, while drive train 40 includes gears 64, 66 and 68. One or more of gears 58, 60 and 62 is sized differently than one or more of gears 64, 66 and 68 to provide gearing speed reduction between carrier 52 and output shaft 28. Gears 58 and 64 are selectively coupled to carrier 52 by clutches 38 and 42. By selectively actuating either clutch 38 or clutch 42, different gears or torques may be transmitted from carrier 52 to output shaft 28. Although drive trains 36 and 40 are illustrated as including a plurality of gears, various other speed reduction mechanisms may be employed such as belt and pulley arrangements or chain and sprocket mechanisms. Furthermore, in lieu of including three such gears, the drive trains 36 and 40 may include a greater or fewer number of gears depending on the desired torque and direction requirements for output shaft 28.

Overall, distribution system 24 simultaneously serves two distinct functions: (1) splitting torque between at least two output shafts and/or at least two drive trains, and (2) providing gear or speed reduction. In the particular embodiments shown, system 24 further facilitates the selection of different speed reduction ratios by selectively actuating one of clutches 38 and 42.

Drive system 20 may be employed in a variety of applications. In one application, drive system 20 is employed in a vehicle. In another application, drive system 20 is employed in manufacturing or other equipment having a plurality of output shafts driven by a single prime mover, wherein rotation of mechanical energy from the prime mover must be split between multiple output shafts and must be reduced in speed.

Figure 2:
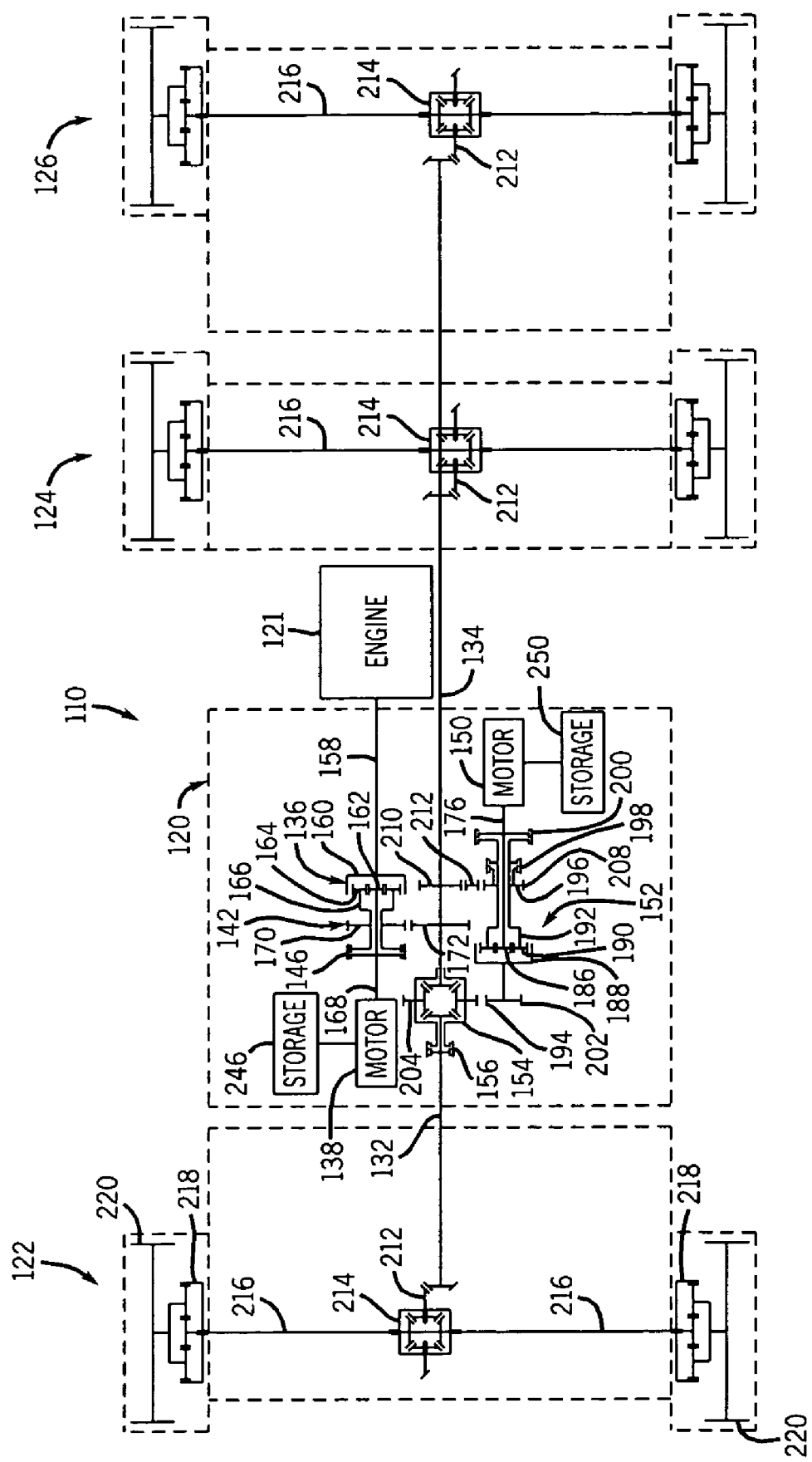
FIG. 2 is a schematic illustration of a vehicle incorporating a first alternative embodiment of the drive system of FIG. 1.
Figure 3:
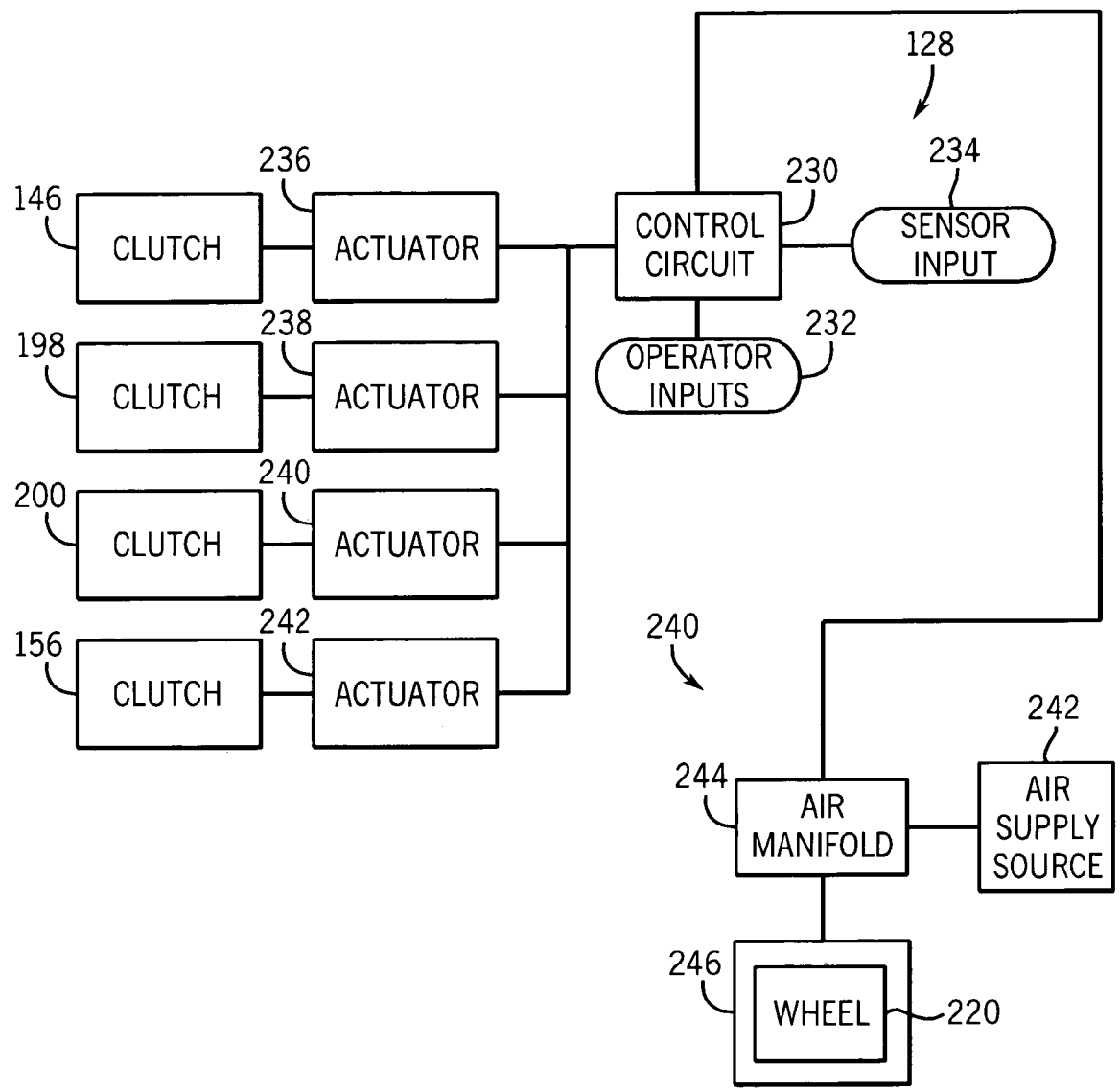
FIG. 3 is a schematic illustration of the control system of the vehicle of FIG. 2.
Figure 4:
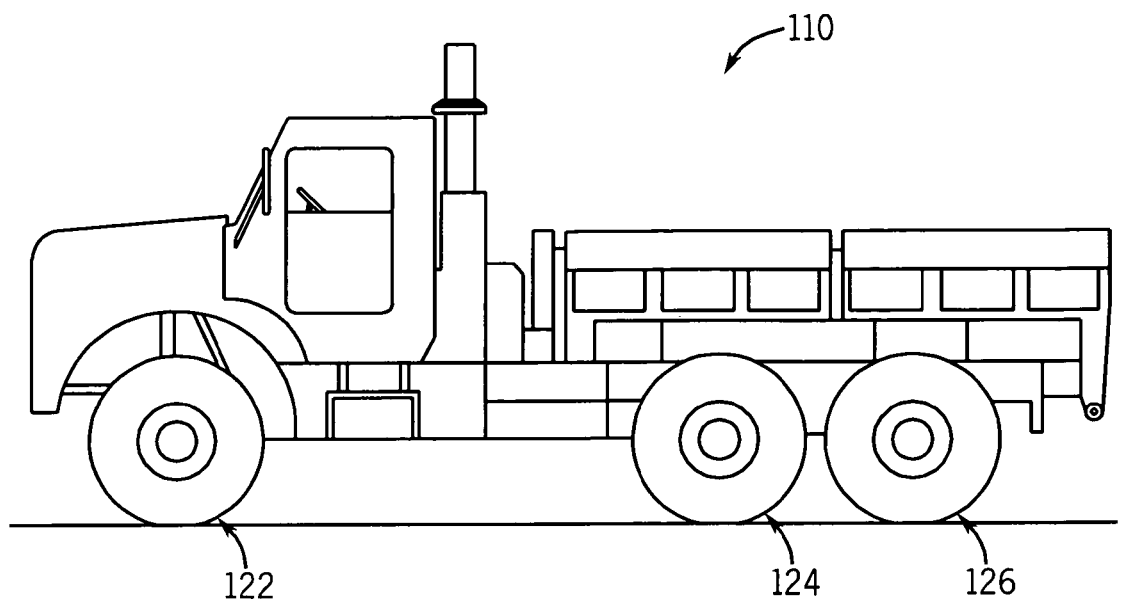
FIG. 4 is a side elevational view of the vehicle of FIG. 2.

FIGS. 2–4 illustrate work vehicle 110 including drive system 120, a first alternative embodiment of drive system 20 shown in FIG. 1. Vehicle 110 additionally includes prime mover 121, front wheel drive 122 and rear wheel drives 124, 126. Prime mover 121 cooperates with drive system 120 to supply torque to each of drives 122, 124 and 126. Drive system 120 generally includes output shaft 132, output shaft 134, planetary gear assembly 136, motor/generator 138, drive train 142, clutch 146, prime mover 150, distribution system 152, differential 154 and clutch 156. Prime mover 121 applies rotational mechanical energy to planetary gear assembly 136 which, in turn, transmits the energy to either motor/generator 138 or output shaft 134, depending upon the state of clutch 146. Prime mover 120 generally comprises a diesel engine.

Planetary gear assembly 136 is coupled to prime mover output shaft 158 and generally includes annular or ring gear 160, sun gear 162, planetary gears 164, and carrier 166. Ring gear 160 is coupled to prime mover output shaft 158 and is in meshing engagement with planetary gears 164. Planetary gears 164 are rotatably supported by carrier 166 between and in meshing engagement with ring gear 160 and sun gear 162. Planetary gears 164 are rotatably supported by carrier 166.

Motor/generator 138 generally comprises a conventionally known or future developed AC or variable frequency drive motor, such as an induction motor. Motor/generator 138 has an output/input shaft 168 coupled to sun gear 162. Motor/generator 138 operates in a first state in which it generates electrical power upon being driven by prime mover 121 and a second state in which it provides rotational mechanical energy to shaft 168 to rotatably drive shaft 168.

Clutch 146 is configured to selectively couple carrier 166 and shaft 168. Clutch 146 moves between an unactuated state in which carrier 166 is not coupled to shaft 168 which results in prime mover 121 driving shaft 168 in a direction such that motor/generator 138 acts as a generator to generate electrical power. In the actuated state, clutch 146 couples differential 166 and shaft 168 such that motor/generator 138 acts as either a motor or a generator depending upon the relative rotational velocities of shaft 168 (being driven by prime mover 121) and the speed of motor/generator 138 itself.

Drive train 142 couples carrier 166 and output shaft 134 to transmit torque therebetween. In the particular embodiment illustrated, drive train 142 includes intermeshing gears 170, 172 to provide appropriate speed reduction and direction to output shaft 134. In lieu of comprising intermeshing gears, drive train 142 may comprise other torque transmitting trains such as belt and pulley arrangements or chain and sprocket arrangements.

Prime mover 150 generally comprises an electric motor configured to provide rotational mechanical energy as an output via output shaft 176 to distribution system 152. Prime mover 150 may comprise any device which converts electrical energy to rotational mechanical energy. In one particular embodiment, prime mover 150 comprises an electric motor configured to also function as a generator.

Distribution system 152 distributes force or torque from prime mover 150 to output shafts 132, 134 while reducing the speed of the force being transmitted to one or both of shafts 132, 134. Distribution system 152 generally includes sun gear 186, annular or ring gear 188, planetary gears 190, carrier 192, drive train 194, drive train 196, clutch 198 and clutch 200. Sun gear 186 is fixedly coupled to prime mover output shaft 176. Planetary gears 190 are rotatably supported by carrier 192 and are between and in meshing engagement with sun gear 186 and ring gear 188. Ring gear 188 is further affixed to drive train 194. Drive train 194 transmits torque from ring gear 188 to differential 154. Drive train 194 generally includes gears 202 and 204.

Drive train 196 extends between carrier 192 and output shaft 134. Drive train 196 is configured to be selectively coupled to at least one of carrier 192 and output shaft 134 so as to transmit torque from carrier 192 to output shaft 134. At the same time, drive train 194 provides appropriate speed reduction and direction to the torque being transmitted. In the particular embodiment illustrated, drive train 196 includes carrier gear 208, output shaft gear 210, and intermediate gear 212. Although less desirable, in alternative embodiments, other drive trains may be employed. For example, alternative drive trains may include a greater number of gears. In addition, such alternative drive trains may utilize other structures such as belt and pulley systems or chain and sprocket systems.

Clutch 198 selectively couples drive train 196 to carrier 192. In the actuated state, clutch 198 couples carrier 192 to drive train 196 such that torque is transmitted to output shaft 134. In an unactuated state, clutch 198 enables gear 208 to freely rotate relative to carrier 192. Although distribution system 152 is illustrated as including clutch 198 to selectively couple gear 208 to carrier 192, system 152 may alternatively include a clutch configured to selectively couple gear 210 to output shaft 134.

Clutch 200 selectively couples prime mover output shaft 176 to carrier 192. In particular, in the actuated state, output shaft 176 is coupled to carrier 192 such that carrier 192, planetary gears 190, and sun gear 186 rotate in unison upon being driven by output shaft 176.

Differential 154 generally comprises a conventionally known differential configured to split torque from drive train 194 between output shafts 132 and 134 in equal proportions. In the particular embodiment illustrated, differential 154 comprises a bevel gear 50/50 split differential.

Clutch 156 comprises a clutch situated between output shafts 132 and 134. Clutch 156 is configured to selectively couple together shafts 132 and 134 such that they operate at the same speed. By locking shafts 132 and 134, actuation of clutch D improves performance when one of drives 122, 124 and 126 is slipping.

Drive 122 generally comprises a front axle assembly of vehicle 110 and includes bevel gear set 212, differential 214, drive axles 216, wheel end reduction units 218 and wheels 220. Bevel gear set 212 receives as input rotational mechanical energy from output shaft 132 and transmits such energy or torque to differential 214. Differential 214 generally comprises a conventionally known differential for slipping torque between drive axles 216. Drive axles 216 extend from differential 214 to wheel end reduction units 218. Wheel end reduction units 218 are located within the framework of wheels 220 and serve to reduce the speed (i.e., increase the torque) of the energy being transmitted to wheels 220. In the particular embodiment illustrated, wheel end reduction unit 218 includes a planetary gear assembly coupled between each of drive shafts 216 and wheel 220. In alternative embodiments, wheel end reduction unit 218 may comprise other conventionally known wheel end reduction configurations.

Wheels 220 receive torque from wheel end reduction units 218 and utilize the torque to provide traction against the ground or other surface upon which vehicle 110 is situated. In the particular embodiment illustrated, wheels 220 comprise tires. In alternative embodiments, wheels 220 may comprise wheels which are utilized as part of other forms of ground motive members such as tracks.

Drives 124 and 126 are substantially identical to one another and are substantially identical to drive 122 except that drives 124 and 126 are located at the rear of vehicle 110 and receive rotational mechanical energy from output shaft 134 in lieu of output shaft 132.

As shown by FIG. 3, control system 128 generally includes control circuit 230, operator input 232, sensor input 234, and actuators 236, 238, 240 and 242. Control circuit 230 generally comprises a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 78 is not limited to any specific combination of hardware circuitry and software, nor to any particular source for the instructions executed by the processing unit. Control circuit 230 is configured to receive input from operator input 232 and sensor input 234. Based upon such input, control circuit 230 generates control signals which are transmitted to actuators 236, 238, 240 and 242. Actuator 236 is coupled to clutch 146 and is configured to move clutch 146 between the actuated state and the unactuated state. Similarly, actuator 238 is coupled to clutch 198 and is configured to move clutch 198 between the actuated state and its unactuated state. Actuator 240 is coupled to clutch 200 and is configured to move clutch 200 between its actuated state and unactuated state. Actuator 242 is coupled to clutch 156 and is configured to move clutch 156 between its actuated state and its unactuated state. In the particular embodiment illustrated, actuators 236, 238, 240 and 242 comprise electrical solenoids. In still other embodiments, actuators 236, 238, 240 and 242 may comprise other conventionally known actuators such as hydraulic or pneumatic actuators.

Sensor inputs 234 include various sensors configured to sense such current characteristics of vehicle 110 such as the current speed of vehicle 110, whether vehicle 110 is turning and a slippage occurring at the wheels, or any other input that could affect the amount of rotational mechanical energy that should be applied to the wheels. Operator input 232 includes, but is not limited to, the operator pressing of the accelerator, manipulating a steering input such as turning a wheel, indicating a slip situation, or any other input that affects the amount of rotational mechanical energy that should be applied to the wheels. Based on such input, control circuit 230 generates control signals to satisfy the needs of vehicle 110.

In the particular embodiment illustrated, vehicle 110 operates in three drive modes or speed ranges: a first low-speed range, a second mid-speed range and a third high-speed range. In the low-speed range (nominally 0 to approximately 14 miles per hour), control circuit 230 generates control signals such that actuator 238 moves clutch 198 to the actuated position and such that actuators 236 and 240 move clutches 146 and 200 to their unactuated states. As a result, rotational mechanical energy provided by prime mover 121 is transmitted to shaft 168 to rotatably drive shaft 168 in a direction opposite to the normal direction of motor 138, causing motor 138 to function as a generator. The electricity produced by motor 138 is stored in storage 246 such as a capacitor or battery and the like, utilized by other portions of vehicle 110, or is provided to prime mover 150 to power prime mover 150 in applications where prime mover 150 comprises an electric motor or other electrically-driven prime mover.

In the low-speed mode, prime mover 150 generates rotational mechanical energy which is transmitted by output shaft 176 to drive sun gear 186. The torque or rotational mechanical energy at sun gear 186 is split between carrier 192 and ring gear 188, while also undergoing speed reduction. Because clutch 198 is in the actuated state to couple carrier 192 to drive train 196, torque from carrier 192 is transmitted by drive train 196 to output shaft 134 for rotationally driving drives 124 and 126. Torque from ring gear 188 is transmitted via drive train 194 to differential 154. Differential 154 splits the torque from ring gear 188 uniformly between output shafts 132 and 134. The torque transmitted to output shaft 132 is utilized to drive drive 122.

Upon vehicle 110 reaching a predetermined speed, control system 128 generates control signals to move drive system 120 from the low-speed mode to a mid-speed mode. In particular, control circuit 230 generates control signals such that actuator 238 moves clutch 198 to the unactuated position and such that actuator 240 moves clutch 200 to the actuated position. Clutch 146 remains in the unactuated position. As a result, rotational mechanical energy provided by prime mover 121 continues to be transmitted to shaft 138 so as to drive motor 138 in a direction such that motor 138 functions as a generator and continues to generate electrical power. Rotational mechanical energy from prime mover 150 in its entirety is transmitted via a distribution system 152 to differential 154 which divides the energy or torque evenly between output shafts 132 and 134.

Upon the speed of vehicle 110 reaching a predetermined elevated speed, control circuit 230 generates control signals which additionally cause actuator 236 to move clutch 246 to the actuated state, engaging or coupling carrier 166 to shaft 168 and sun gear 162. As a result, drive train 142 is driven in an opposite direction as compared to when clutch 146 is in the unactuated state. The rotational mechanical energy from prime mover 121 is transmitted to output shaft 132 via drive train 142. Accordingly, at high speeds, most of the torque required to power drive 124 and 126 is provided by prime mover 121, which may comprise an engine. At such high speeds, motor/generator 138 may function either as a generator or as a motor to meet the particular demands of vehicle 110. For example, in one embodiment in which prime mover 150 comprises an electric motor/generator electrically driven at least in part by motor/generator 138, motor/generator 138 may function as a generator to provide electrical power to prime mover 150 such that prime mover 150 drives front drive 122 such as in a slip condition. Alternatively, if electrical energy is stored and available for both prime mover 150 and motor/generator 138, drive system 120 may be provided with peaking power, wherein one or both of motors 138 and prime mover 150 drive and provide power to output shafts 132 and 134.

In the embodiment in which prime mover 150 generally comprises an electric motor/generator, prime mover 150 also functions as a generator during braking of vehicle 110. In particular, when vehicle 110 is decelerating, most of which is done through front drive 122, the power is transferred by differential 154 and is transmitted to prime mover 150 which absorbs the energy and stores the energy for later use in storage devices 250 such as capacitors, batteries and the like. The energy is absorbed in by magnets in prime mover 150. A load is placed on prime mover 150 by electrically connecting prime mover 150 to a storage device which increases the load (i.e., placing a drive on the motor) on prime mover 150. The stored energy may then later be used when prime mover 150 functions as a motor or may be used by other devices requiring electrical power or by other electrically powered devices.

As further shown by FIG. 3, vehicle 110 additionally includes a central tire inflation system 240. Central tire inflation system 240 generally includes an air supply source 242, and an air manifold 244, in addition to the previously discussed wheel 220 and control circuit 230. The air supply source comprises a source for providing pressurized air to wheel 220 when wheel 220 additionally includes an inflatable tire 246 disposed on wheel 220. Air manifold 244 regulates the supply of air to tire 246 from the air supply source 242. Air manifold 234 regulates the supply of air in response to control signals from control circuit 230.

Control circuit 230 generates central tire inflation control signals based upon torque and speed requirements of vehicle 110. Tire pressure is regulated and optimized based upon such signals and additionally based upon potential users supplied input. As a result, control circuit 230 additionally operates as a central tire inflation system control unit.

Figure 5:
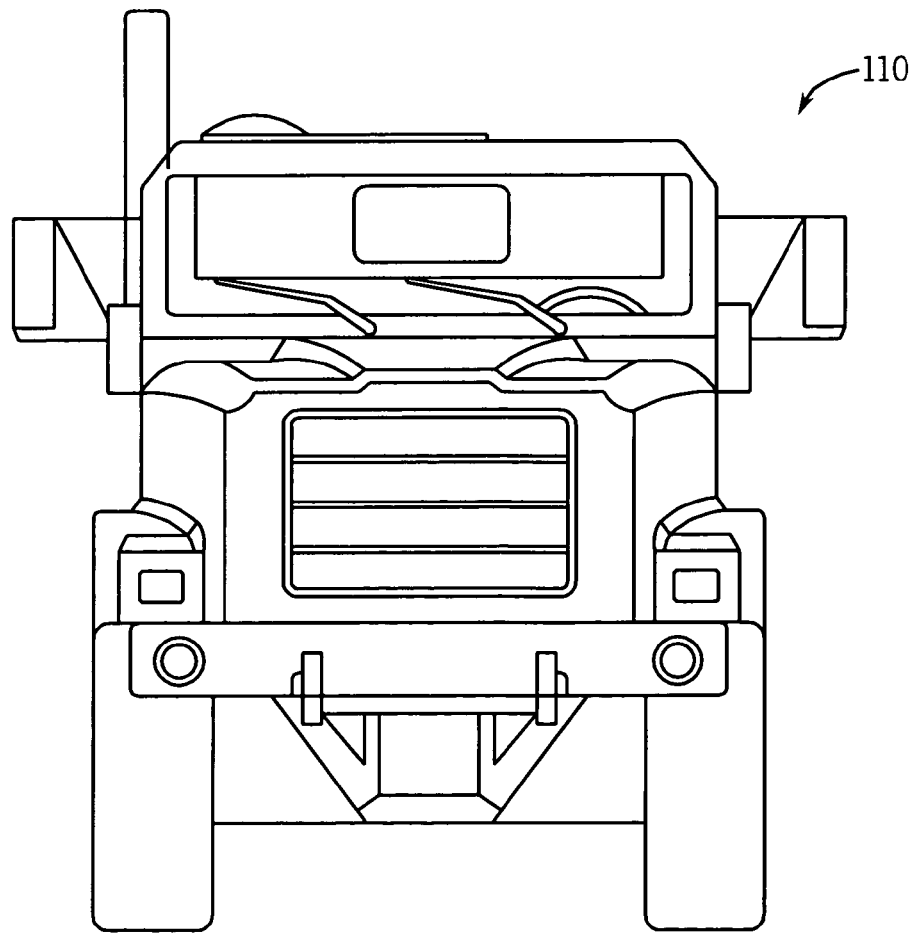
FIG. 5 is a front elevational view of the vehicle of FIG. 2.

FIGS. 2, 4 and 5 illustrate drive system 120 employed in vehicle 110 in a 6×6 configuration which operates in a series mode at low speed and parallel mode at high speed. In the particular 6×6 configuration shown, distribution system 152 is appropriately configured (by sizing of the gears of the planetary gear system) in conjunction with differential 154 to split power from prime mover 150 such that 30% of the power is transmitted to output shaft 132 and 70% of the power is transmitted to output shaft 134 at low speeds. At such low speeds, wheel torque is high in pending slip. Such torque applied to drives 122, 124 and 126 needs to be equal to the load on such axles. Since a 6×6 configured vehicle normally has 30% of its weight on a front axle or drive and 70% of its weight on the rear axles, distribution system 152 and differential 154 cooperate to appropriately split power at such low speeds. At higher speeds, wheel torque is lower and impending slip is not a factor. In contrast, braking performance and regenerated braking performance become more important. Consequently, in the mid-speed mode, torque from prime mover 150 is split 50/50 between front drive 122 and rear drive 124, 126. In the mid-speed mode, a braking load upon the front axle or drive 122 is higher as compared to when vehicle 110 is in the lower speed mode. Because clutch 198 is in the unactuated state in the mid-speed mode, 100% of the braking load applied to front drive 122 is created by prime mover 150 functioning as a generator during regenerative braking.

FIGS. 4 and 5 illustrate an example of vehicle 110 in which drive system 120 may be employed. The vehicle shown in FIGS. 4 and 5 is a conventionally known MTVR vehicle presently sold by Oshkosh Truck Corporation, except that drive system 120 is employed in lieu of the conventional drive system. In the particular embodiment illustrated, drive system 120 replaces the conventional transfer case (weighing 860 pounds) and transmission with a 200-horsepower 2-pole generator, two 100-horsepower motors and gear boxes. As a result, the 6×6 configured MTVR vehicle employing drive system 120 achieves a weight savings.

Overall, drive system 120 provides weight reduction and drive train efficiency. At low speeds, power is transmitted through an electrical couple and at high speeds are mechanical couple. At low speeds where the ratio between the engine and the wheel is high, an electrical couple provides excellent power control with minimal weight. At high speeds when the ratio between the engine and the wheel is low, a mechanical couple is provided for high efficiency. Because high/low torque is developed at a remote transmission with electrical motors instead of in a transmission connected to the engine, weight is reduced because larger drive shafts and transfer cases are not required. Conversely, when wheel torque is low, system 120 provides an efficient mechanical link to connect the engine to the wheel.

Although drive system 120 is illustrated as being employed in an MTVR having a 6×6 configuration, drive system 120 may alternatively be employed in MTVRs having other configurations such as 4×4 or 8×8 configurations. In lieu of being employed in an MTVR, drive system 120 may be employed in other vehicles such as vehicles including palletized load handling systems, as well as other conventionally known or future developed vehicles.

Figure 6:
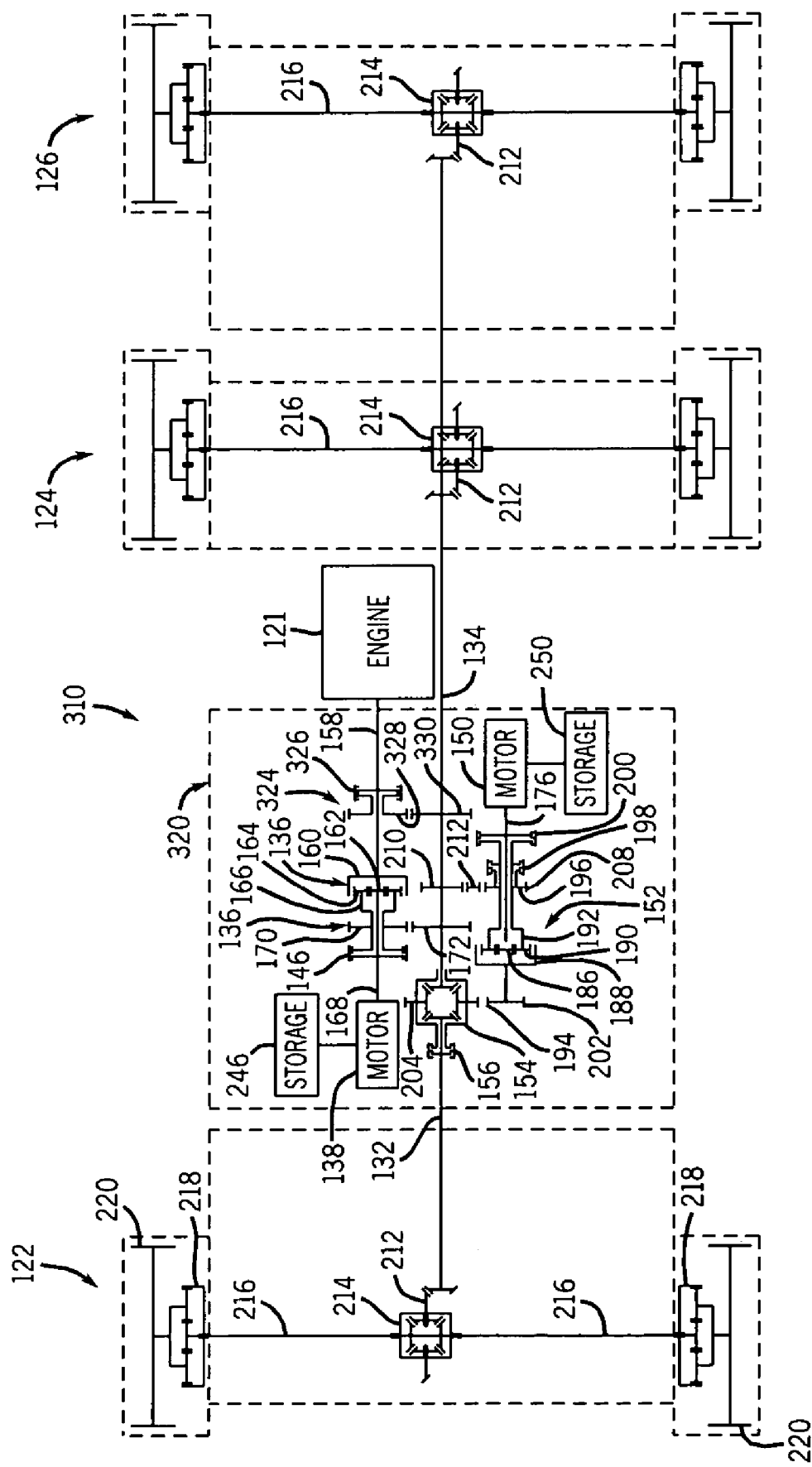
FIG. 6 is a schematic illustration of the vehicle including a second alternative embodiment of the drive system of FIG. 1.

FIG. 6 is a schematic illustration of vehicle 310, an alternative embodiment of vehicle 110. Vehicle 310 is substantially identical to vehicle 110, except that vehicle 310 includes drive system 320 in lieu of drive system 120. Drive system 320 is similar to drive system 120 such that drive system 320 additionally includes drive train 324 and clutch 326. Drive train 324 is coupled between prime mover output shaft 158 and output shaft 134 and is configured to transmit power from shaft 158 to shaft 134. In the particular embodiment illustrated, drive train 324 includes gears 328 and 330 which are in meshing engagement with one another. Gear 328 is selectively coupled to shaft 158 by clutch 326. In lieu of utilizing gears, drive train 324 may comprise other conventionally known or future developed means for transmitting torque such as belt and pulleys or chain and sprocket arrangements.

Clutch 326 selectively couples gear 328 to shaft 158. In the particular embodiment shown, clutch 326 is moved between an actuated state in which shaft 158 is coupled to gear 328 and an unactuated state by an actuator (not shown) which operates in response to control signals from control circuit 230 (shown in FIG. 3). When clutch 326 is in the actuated state, rotational of mechanical energy or torque from prime mover 121 is directly transmitted to output shaft 134. In the particular embodiment illustrated, gears 328 and 330 are configured to provide drive system 320 with an overdrive when clutch 326 is engaged. In particular, gears 328 and 330 provide a different gear ratio as compared to drive train 142 when clutch A is engaged.

Although clutch 326 is illustrated for selectively coupling shaft 158 to gear 328 of drive train 324, clutch 326 may alternatively be located and configured to selectively couple output shaft 134 to gear 330 of drive train 324.

Figure 7:
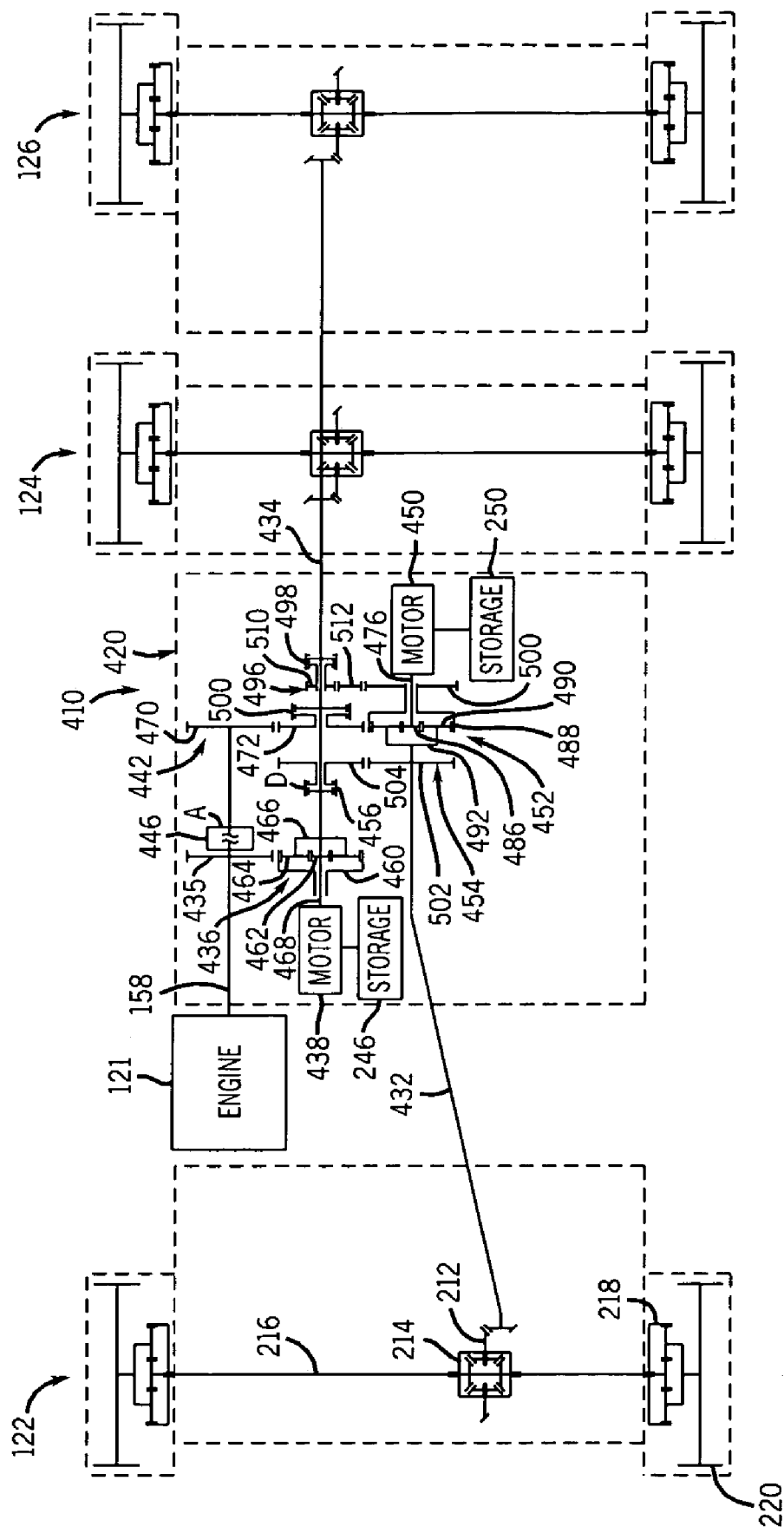
FIG. 7 is a schematic illustration of a vehicle including a third alternative embodiment of the drive system of FIG. 1.

FIG. 7 is a schematic illustration of vehicle 410, an alternative embodiment of vehicle 110. Vehicle 410 is similar to vehicle 110 except that vehicle 410 includes drive system 420 in lieu of drive system 120. For ease of illustration, those remaining components or elements of vehicle 410 which correspond to vehicle 110 are numbered similarly. Drive system 420 cooperates with prime mover 121 to transmit torque to drives 122, 124 and 126. Drive system 420 generally includes output shaft 432, output shaft 434, drive train 435, planetary gear assembly 436, motor/generator 438, drive train 442, clutch 446, prime mover 450, distribution system 452, drive train 454 and clutch 456. Drive train 435 is connected to prime mover output shaft 158 and transmits torque from prime mover 121 to planetary gear assembly 436. In the particular embodiment illustrated, drive train 430 generally comprises a pinion gear intermeshed with planetary gear assembly 436.

Planetary gear assembly 436 is coupled between output shaft 434, drive train 435 and motor/generator 438. Planetary gear assembly 436 includes ring gear 460, sun gear 462, planetary gears 464 and carrier 466. Ring gear 460 is in intermeshing engagement with drive train 435 and planetary gears 464. Planetary gears 464 are rotatably supported by carrier 466 and are in intermeshing engagement with sun gear 462. Carrier 466 is coupled to output shaft 434. Sun gear 462 is coupled to motor/generator 438. Overall, planetary gear assembly 436 splits torque from prime mover 121 between output shaft 434 and motor/generator 438.

Motor/generator 438 generally comprises a conventionally known or future developed AC or variable frequency drive motor, such as a permanent magnet motor. Motor/generator 438 has an output/input shaft 468 coupled to sun gear 462. Motor/generator 438 operates in a first state in which it generates electrical power upon being driven by prime mover 121 and a second state in which it provides rotational mechanical energy to shaft 468 to rotatably drive output shaft 434.

Drive train 432 is selectively coupled to prime mover output shaft 158 by clutch 446. Drive train 442 includes a plurality of intermeshing gears 470, 472 that are selectively coupled to output shaft 434. Gear 472 is also in engagement with ring gear 488 of distribution system 452. Although drive train 470 is illustrated as comprising intermeshing gears, drive train 470 may comprise other conventionally known or future developed drive trains which utilize belt and pulley arrangements or chain and sprocket arrangements.

Prime mover 450 generally comprises an electric motor configured to provide rotational mechanical energy as an output via output shaft 476 to distribution system 452. Prime mover 450 may comprise any device which converts electrical energy to rotational mechanical energy. In one particular embodiment, prime mover 450 comprises an electric motor configured to also function as a generator.

Distribution system 452 distributes force or torque from prime mover 450 to output shafts 432 and 434 while reducing the speed of the force being transmitted to one or both of shafts 432, 434. Distribution system 452 generally includes sun gear 486, ring gear 488, planetary gears 490, carrier 492, drive train 496, clutch 498 and clutch 500. Sun gear 486 is fixedly coupled to prime mover output shaft 476. Planetary gears 490 are rotatably supported by carrier 492 and are between and in meshing engagement with sun gear 486 and ring gear 488. Ring gear 488 is further affixed to drive train 496 and is in meshing engagement with gear 472 of drive train 442. Ring gear 488 transmits torque to drive trains 442 and 496. Carrier 492 rotatably supports sun gears 490 and is affixed to output shaft 432.

Drive train 496 extends between ring gear 488 and output shaft 434. Drive train 496 is configured to be selectively coupled to output shaft 434 by clutch 498. In the particular embodiment illustrated, drive train 496 includes gears 508, 510 and 512. In an unactuated state, clutch 498 permits gear 510 to freely rotate relative to output shaft 434. Although distribution system 452 is illustrated as including clutch 498 to selectively couple gear 510 to output shaft 434, system 452 may alternatively be configured so as to include a clutch configured to selectively couple gear 508 to ring gear 488. Although drive train 596 is illustrated as including three intermeshing gears 508, 510 and 512, drive train 496 may alternatively include a fewer or greater number of gears or may include other drive train mechanisms such as belt and pulley arrangements or chain and sprocket arrangements.

Drive train 454 is coupled between output shaft 432 and input and output shaft 434. Drive train 454 is selectively coupled to at least one of output shafts 432 and 434. In the particular embodiment illustrated, drive train 454 is selectively coupled to output shaft 434 by clutch 456. In alternatively embodiments, drive train 454 may alternatively or additionally be selectively coupled to output shaft 432 by a clutch. In the particular embodiment illustrated, drive train 454 includes gears 502, 504. In the actuated state, clutch 456 secures gear 504 to output shaft 434 so as to lock output shafts 432 and 434 together such that they operate at the same speed. As a result, actuation of clutch 456 improves performance when one of drives 122, 124 and 126 is slipping.

Figure 8:
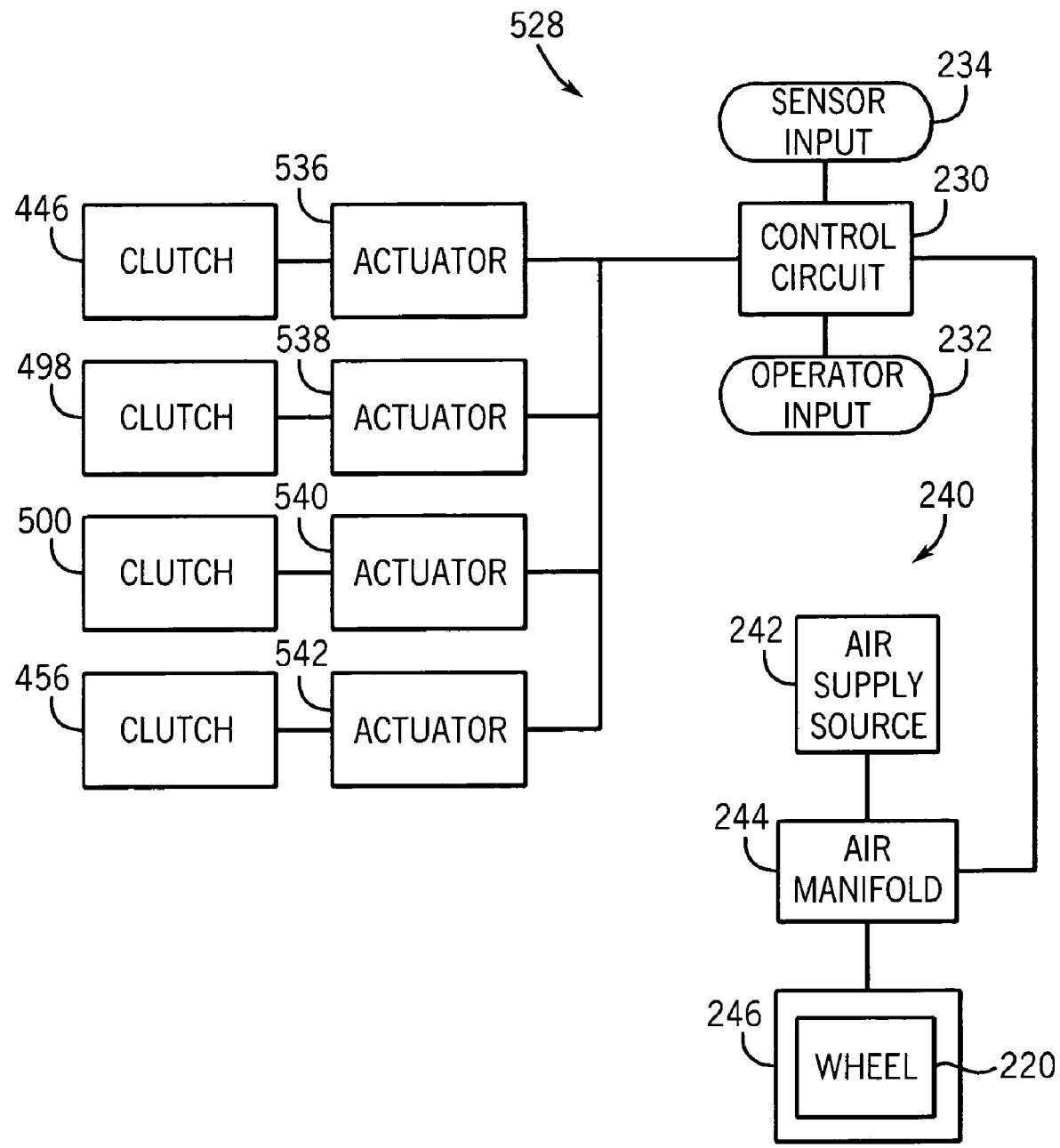
FIG. 8 is a schematic illustration of a control system of the vehicle of FIG. 7.

FIG. 8 illustrates control system 528 which controls the operation of drive system 420. Control system 528 is substantially identical to control system 128 except that control system 528 includes actuators 536, 538, 540 and 542 in lieu of actuators 236, 238, 240 and 242. For ease of illustration, those remaining components of control system 528 which correspond to control system 128 are numbered similarly. Actuators 536, 538, 540 and 542 comprise conventionally known or future developed devices configured to move clutches 446, 498, 500 and 456, respectively, between an unactuated state and an actuated state. Actuators 536, 538, 540 and 542 perform such actuation in response to control signals from control circuit 230. As noted above, control circuit 230 generates such control signals based upon both operator input 232 and sensor input 234.

In the particular embodiment illustrated, vehicle 410 operates in three drive modes or speed ranges: a first low-speed range, a second mid-speed range and a third high-speed range. In the low-speed range, control circuit 230 generates control signals such that actuator 538 moves clutch 498 to the unactuated position and such that actuators 536 and 540 move clutches 446 and 500 to their unactuated states. As a result, rotational mechanical energy provided by prime mover 121 is transmitted to shaft 468 in a direction opposite the normal direction of motor/generator 438, causing motor/generator 438 to function as a generator. The electricity produced by motor 438 is stored, utilized by other portions of vehicle 410 or is provided to prime mover 450 to power prime mover 450 in applications where prime mover 450 comprises an electric motor or other electrically driven prime mover.

In the low speed mode, prime mover 450 generates rotational mechanical energy which drives sun gear 492. This energy is split by planetary gears 490 and carrier 492 between ring gear 488 and output shaft 432, while also undergoing speed reduction. Because clutch 498 is in the actuated state, drive train 496 is fixed between ring gear 488 and output shaft 434. As a result, torque is further transmitted to output shaft 434. This torque is utilized to drive drives 124 and 126.

Upon vehicle 410 reaching a predetermined speed as served and input to circuit 230 by sensor input 234, control circuit 230 generates control signals to move drive system 420 from the low-speed mode to a mid-speed mode. In particular, control circuit 230 generally has control signals such that actuator 538 moves clutch 498 to the unactuated position and such that actuator 540 moves clutch 500 to the actuated position. Clutch 456 remains in the unactuated position. As a result, rotational mechanical energy provided by prime mover 121 continues to be transmitted to shaft 468 so as to drive motor/generator 438 in a direction such that motor 438 functions as a generator and continues to generate electrical power. Rotational mechanical energy from prime mover 450 is split by distribution system 452 between output shaft 432 and drive train 442. Because of the gear ratios chosen, this torque is transmitted evenly between output shaft 432 and drive train 442. Because clutch 500 is in the actuated state, gear 472 of drive train 442 is fixed to output shaft 432, resulting in torque being transmitted to output shaft 434 and drives 124, 126.

Upon the speed of vehicle 410 in reaching a predetermined elevated speed, control circuit 230 generates control signals which additionally cause actuator 536 to move clutch 446 to the actuated state, engaging or coupling prime mover output shaft 158 to drive train 442. As a result, the rotational mechanical energy from prime mover 121 is transmitted to output shaft 434 via drive train 442. At high speeds, most of the torque required to power drive 124 and 126 is provided by prime mover 121.

When a slipped condition is sensed or otherwise determined, control circuit 230 must be configured to generated control signals such that actuator 542 moves clutch 456 from an unactuated state to an actuated state. In the actuated state, clutch 456 affixes gear 504 to output shaft 434, locking output shafts 432 and 434.

Figure 9:
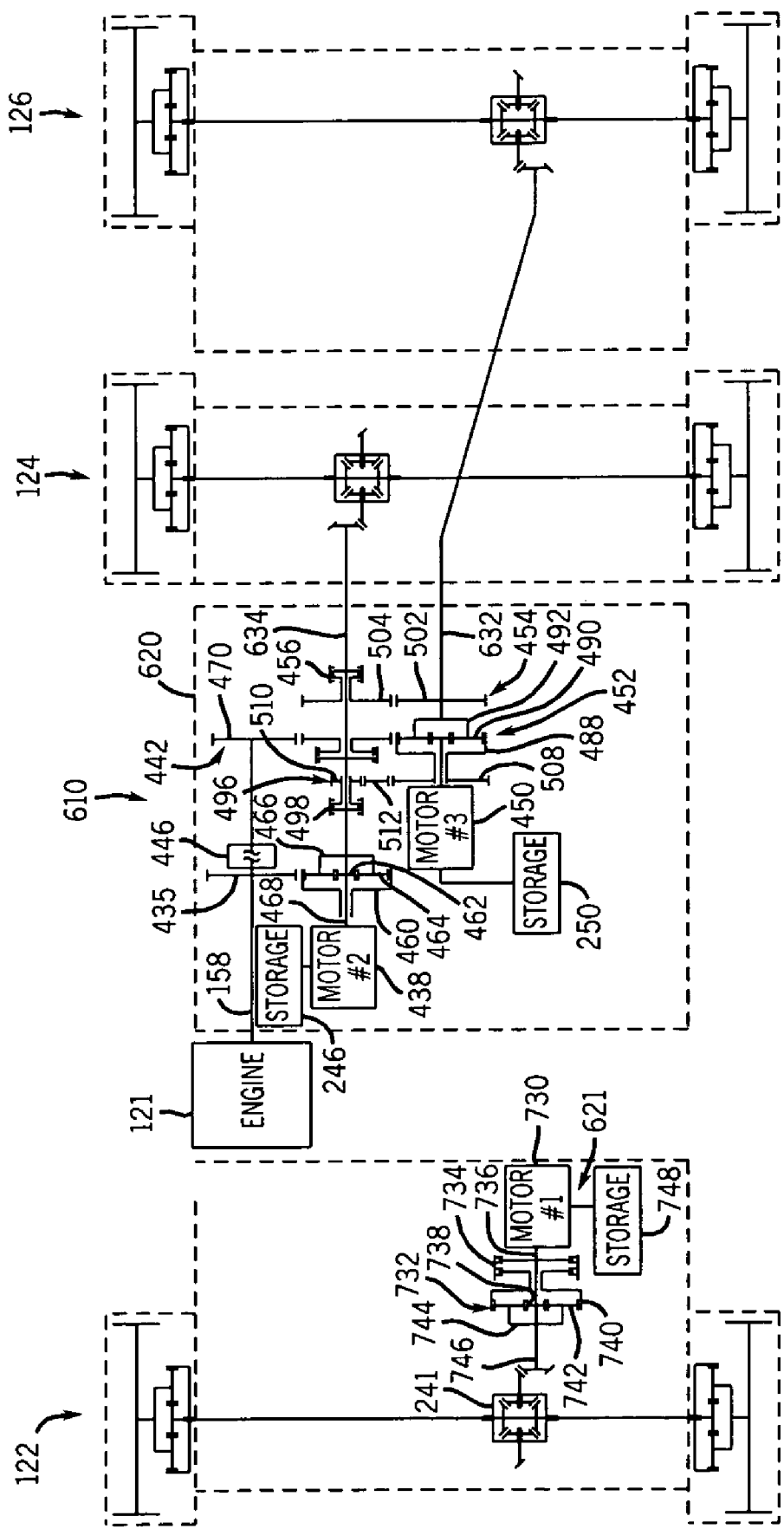
FIG. 9 is a schematic illustration of a vehicle including a fourth alternative embodiment of the drive system of FIG. 1.
Figure 10:
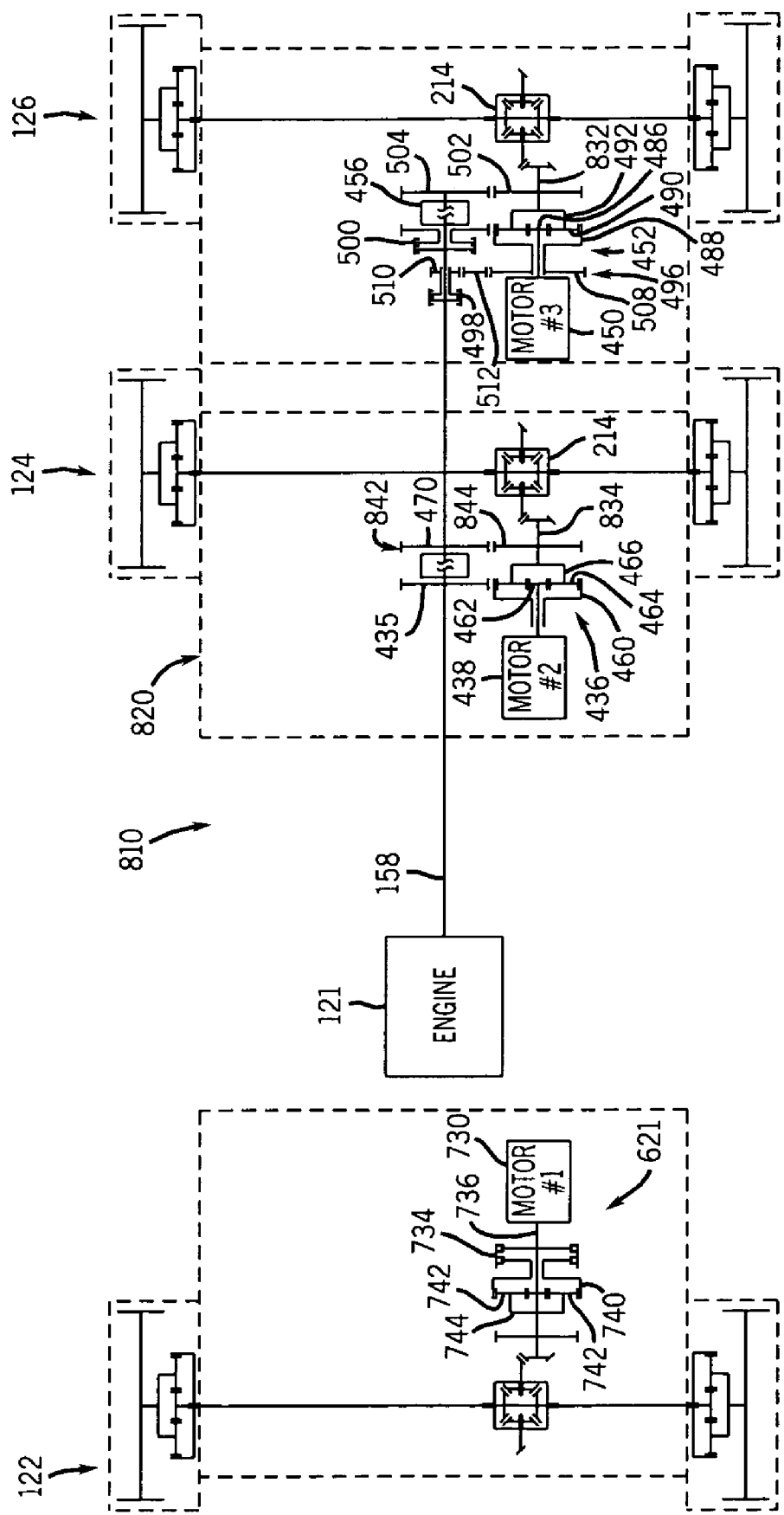
FIG. 10 is a schematic illustration of a vehicle including a fifth alternative embodiment of the drive system of FIG. 1.

FIGS. 9 and 10 illustrate vehicle 610, an alternative embodiment of vehicle 110. Vehicle 610 is similar to vehicle 410 except that vehicle 610 includes drive system 620 and additionally includes an independent front drive system 621. Drive system 620 is similar to drive system 420 except that drive system 620 includes output shafts 632 and 634 in lieu of output shafts 432 and 434, respectively. For ease of discussion, those remaining elements of drive system 620 which correspond to elements of drive system 420 and those remaining elements of vehicle 610 which correspond to similar elements of vehicle 410 are numbered similarly. In contrast to output shaft 434, output shaft 634 applies rotational mechanical energy only to drive 124. Output shaft 632 supplies rotational mechanical energy to drive 126. As a result, drive system 620 is capable of driving drives 124 and 126 at different speeds relative to one another.

Vehicle 610 utilizes control system 528 shown and described with respect to FIG. 8. Like vehicle 410, vehicle 610 operates in three drive modes or speed ranges. In its low-speed mode, control circuit 230 generates control signals such that actuator 538 moves clutch 498 to an actuated position and such that actuators 536 and 540 move clutches 446 and 500 to their unactuated states. Actuator 542 also moves or maintains clutch 456 in an unactuated state. As a result, rotational mechanical energy provided by prime mover 121 is transmitted to motor 438 in a direction such that motor 438 functions as a generator. In the low-speed mode, prime mover 450 generates rotational mechanical energy which is split by distribution system 452 between output shafts 632 and 634 to drive drives 124 and 126. Upon vehicle 610 reaching a predetermined speed, control circuit 230 generates control signals to move drive system 620 from the low-speed mode to a mid-speed mode. In particular, control circuit 230 generates control signals such that actuator 538 moves clutch 498 to the unactuated position and such that actuator 540 moves clutch 500 to the actuated position. Clutch 446 remains in the unactuated position. As a result, rotational mechanical energy provided by prime mover 121 continues to be transmitted to motor 438 so as to drive motor 438 in a direction such that motor 438 functions as a generator. Rotational mechanical energy from prime mover 450 is transmitted via distribution system 452 to output shaft 632 and 634. However, because torque is transmitted to output shaft 634 via drive train 442 in lieu of drive train 496, output shaft 634 is driven at a lower torque with a higher speed. Upon the speed of vehicle 610 reaching a predetermined elevated speed, control circuit 230 generates control signals which move drive system 620 to a high-speed mode. In the high-speed mode, control circuit 230 generates control signals which additionally cause actuator 536 to move clutch 446 to the actuated state, engaging or coupling output shaft 158 to drive train 442. As a result, the rotational mechanical energy provided by engine 121 is supplied directly to output shaft 634 to power drive 124.

Front drive system 621 powers front drive 122. Front system 621 includes prime mover 730, planetary gear assembly 732 and clutch 734. Prime mover 730 generally comprises a source of rotational mechanical energy which is derived from a stored energy source. In the embodiment illustrated, prime mover 730 comprises an electrical motor/generator such as a conventionally known or future developed AC or variable frequency drive motor. In alternative embodiments, prime mover 730 may comprise other devices or mechanisms such as an internal combustion gas-powered engine, a diesel engine, turbines, fuel cell driven motors, an electric motor or any other type of motor capable of providing rotational mechanical energy to the prime mover output shaft 736.

Planetary gear assembly 732 transmits rotational mechanical energy from prime mover 730 to differential 214 of drive 122. Planetary gear assembly 732 cooperates with clutch 734 to vary torque being provided to drive 122. Planetary gear assembly 732 includes sun gear 738, ring gear 740, planetary gear 742 and carrier 744. Sun gear 738 is fixed to output shaft 736 and is in meshing engagement with planetary gears 742. Planetary gears 742 are rotatably supported by carrier 744 and are in intermeshing engagement with sun gear 738 and ring gear 740. Carrier 744 is affixed to output shaft 746 which includes a bevel gear in meshing engagement with bevel 212. Clutch 734 is configured to selectively couple output shaft 736 to ring gear 740. In a first state, clutch 734 secures ring gear 740 against rotation. As a result, torque provided by prime mover 730 is transmitted through sun gear 738 and planetary gear 742 to carrier 744 and to drive 122 at a reduced speed and at a higher torque. In a second state, clutch 734 locks ring gear 740 to sun gear 738 such that rotational mechanical energy from prime mover 730 is directly transmitted to differential 214 without any speed reduction, resulting in a higher speed, lower torque. During braking, clutch 734 is moved to the engaged state to effectuate regenerative braking, wherein prime mover 730 functions as a generator to generate electrical power which is either stored in storage 748 or used by other devices or motors of vehicle 610.

FIG. 10 illustrates vehicle 810, an alternative embodiment of vehicle 110. Vehicle 810 is similar to vehicle 610 except that vehicle 810 includes drive system 820 in lieu of drive system 620. Drive system 820 is similar to drive system 620 except that rather than being provided as a single unit, portions of drive system 20 are separated from one another and are positioned proximate to drives 124 and 126. To effectuate this result, drive system 820 additionally includes drive shaft 841, wherein drive train 496 is selectively coupled to drive shaft 841 by clutch 498, wherein gear 472 is selectively coupled to drive shaft 841 by clutch 500 and wherein gear 504 is selectively coupled to drive shaft 841 by clutch 456. As shown by FIG. 10, drive system 820 includes drive train 842, including gears 470 and 844, in lieu of drive train 442. Gear 470 is fixed to drive shaft 841 while gear 844 is affixed to output shaft 834. Gear 472 is arranged in a separate sub-unit proximate drive 126.

Similar to vehicle 610, vehicle 810 operates in three-speed modes. In a low-speed mode, clutches 446, 500 and 456 are moved or maintained in the unactuated state while clutch 498 is moved or maintained in an actuated or engaged state by their respective actuators (shown in FIG. 8) in response to control signals from control circuit 230. As a result, rotational mechanical energy from prime mover 121 is transmitted by gear 435 to planetary gear system 436 and to motor 438 such that motor 438 functions as a generator. Prime mover 450 generates rotational mechanical energy which is split and reduced in speed by distribution system 452 between output shafts 832 and 834. In particular, the torque generated by prime mover 450 is transmitted to output shaft 832 through carrier 492. Rotational mechanical energy from prime mover 450 is transmitted to output shaft 834 across drive train 496, drive shaft 841 and drive train 842.

In the mid-speed mode, clutch 498 is disengaged or unactuated while clutch 500 is engaged or actuated. Clutches 446 and 456 remain unactuated or disengaged. As a result, rotational mechanical energy from prime mover 121 continues to drive motor 438 in a reverse direction such that motor 438 functions as a generator. Rotational mechanical energy from prime mover 450 is split and reduced in speed between output shafts 832 and 834 by distribution system 452. In particular, rotational mechanical energy from prime mover 450 is transmitted to output shaft 832 by carrier 492. Rotational mechanical from prime mover 450 is transmitted to output shaft 834 by ring gear 488, gear 472, drive shaft 841 and drive train 842. In the mid-speed range, rotational mechanical energy from prime mover 121 is also transmitted to output shaft 834 by gear 435, ring gear 460 and carrier 466. As the rotational velocity of prime mover output shaft 158 is increased, the percentage of rotational mechanical energy provided to output shaft 834 by prime mover 121 also increases.

In the high-speed mode, clutch 446 is additionally engaged. As a result, rotational mechanical energy from prime mover 121 is directly transmitted to output shaft 834 across drive train 842. In this mode, prime mover 121 provides substantially all of the rotational mechanical energy for driving output shaft 834. Rotational mechanical energy from engine 121 is continued to be transmitted to output shaft 832 across gear 472 and distribution system 452. In this embodiment, additional energy may be provided to output shaft 832 and output shaft 834 from prime mover 450 if desired.

Figure 11:
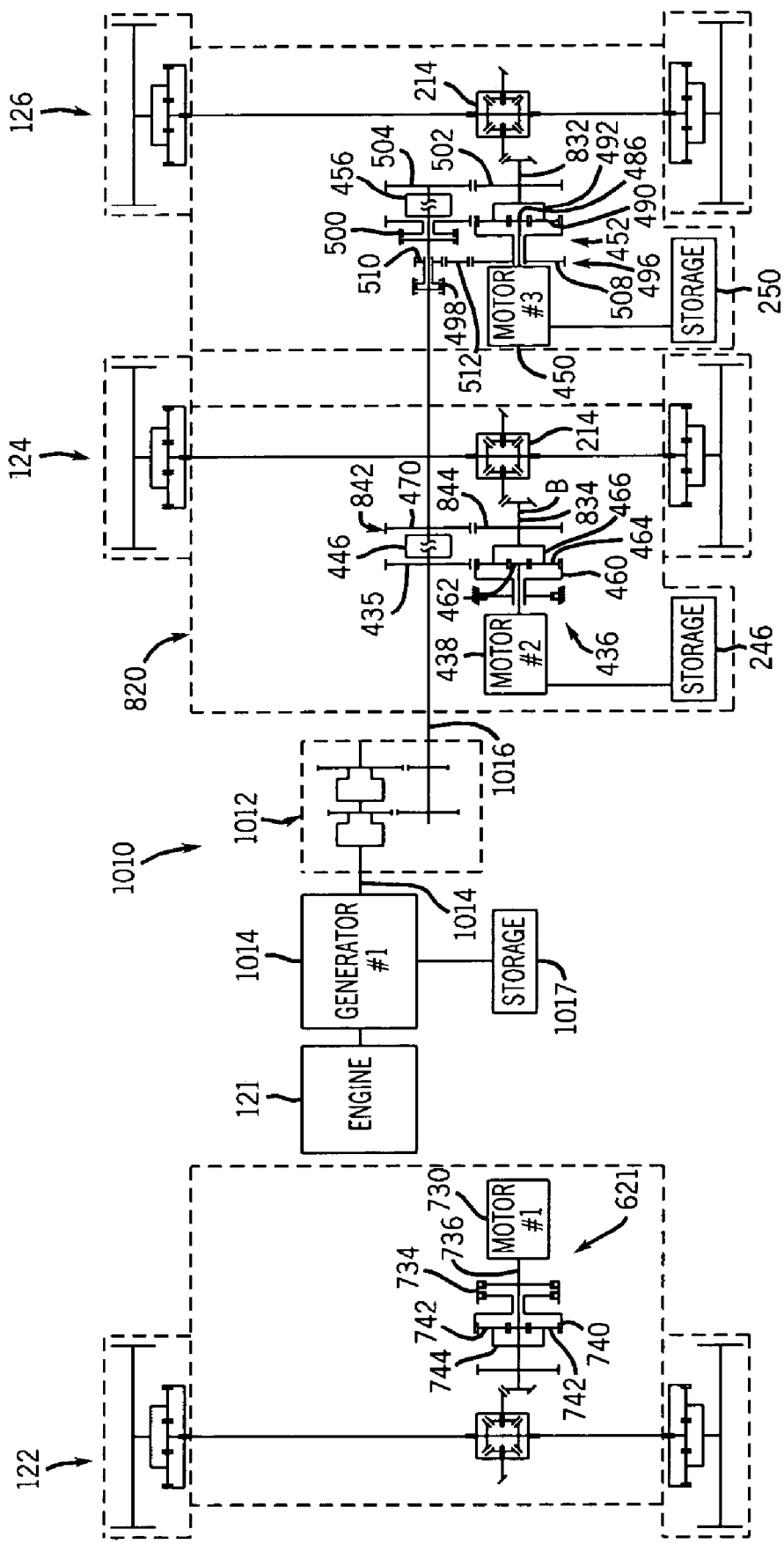
FIG. 11 is a schematic illustration of an alternative embodiment of the vehicle of FIG. 10.

FIG. 11 schematically illustrates vehicle 1010, an alternative embodiment of vehicle 110. Vehicle 1010 is substantially identical to vehicle 810 illustrated in FIG. 10 except that vehicle 1010 additionally includes a change speed gear box or transmission 1012 and generator 1014. Transmission 1012 is coupled between prime mover 121 and drive system 820. Transmission 1012 is conventionally known and is configured to change the speed of the rotational mechanical energy output to drive shaft 1016.

Generator 1014 comprises a conventionally known or future developed generator coupled between transmission 1012 and prime mover 121. Generator 1014 is configured to receive rotational mechanical energy from prime mover 121 and to convert the energy into electrical power which is stored in an electrical storage 1017 or which is utilized by motor/generator 438, prime mover 450 or other electrically powered devices of vehicle 1010. In alternative embodiments, vehicle 1010 may omit one or both of transmission 1012 or generator 1014.

Figure 12:
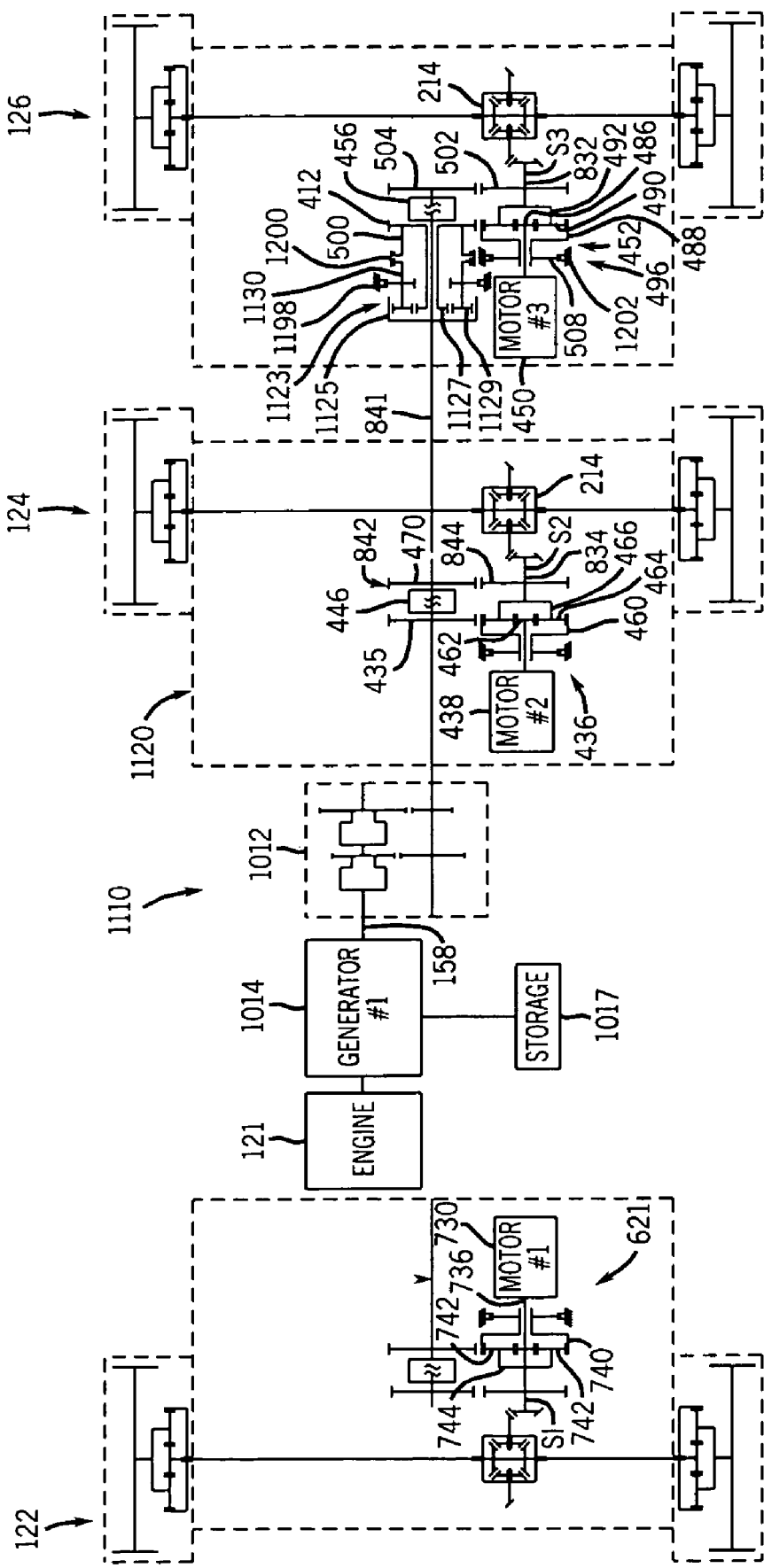
FIG. 12 is a schematic illustration of a vehicle including an sixth alternative embodiment of the drive system of FIG. 1.

FIG. 12 illustrates vehicle 1110, an alternative embodiment of vehicle 1010. Vehicle 1110 is substantially identical to vehicle 1010 except that vehicle 1110 includes drive system 1020 in lieu of drive system 820. Drive system 1120 is similar to drive system 820 except that drive system 1120 includes planetary gear assembly 1123, clutches 1198, 1200 and brake 1202 in lieu of drive train 496, clutch 498 and clutch 500. Planetary gear assembly 1123 includes ring gear 1125, sun gear 1127, planetary gears 1129 and carrier 1130. Sun gear 1125 is secured to drive shaft 841 and is in engagement with planetary gears 1129 which are in intermeshing engagement with both ring gear 1125 and sun gear 1127. Sun gear 1127 is secured to gear 472 which is in meshing engagement with ring gear 488 of distribution system 452.

Clutch 1198 is configured to selectively couple carrier 1130 to a stationary structure to prevent rotation of carrier 1130. Clutch 1200 is configured to selectively couple carrier 1130 to sun gear 1127 and gear 472.

Like vehicle 1010, vehicle 1110 operates in three-speed modes. In a low-speed mode, clutch 1200 is engaged while clutches 446, 456 and 1198 are disengaged by actuators which operate in response to control signals from a control system. As a result, rotational mechanical energy from prime mover 121 drives motor/generator 438 in a reverse direction such that motor/generator 438 functions as a generator to generate electrical power. In one embodiment, this electrical power is utilized by prime mover 450. The rotational mechanical energy produced by prime mover 450 is reduced in speed and is split by distribution system 452 between output shaft 832 and output shaft 834. In particular, rotational mechanical energy from prime mover 450 is transmitted through sun gear 486 and carrier 492 to output shaft 832. Rotational mechanical energy is transmitted through sun gear 486, planetary gears 490, ring gear 488, gear 472, ring gear 1125, drive shaft 841 and drive train 842 to output shaft 834.

In a mid-speed mode, clutch 1200 is disengaged while clutch 1198 is engaged. Clutches 446 and 456 remain disengaged. Rotational mechanical energy from prime mover 121 is divided by planetary gear assembly 436 between motor/generator 438 and output shaft 834. As the rotational velocity of the rotational mechanical energy provided by prime mover 121 increases, greater mechanical energy or torque is provided to output shaft 834 by prime mover 121. The rotational mechanical energy provided to motor/generator 438 is converted into electrical power. Rotational mechanical energy from prime mover 450 is split between output shaft 832 and output shaft 834. In particular, rotational mechanical energy from prime mover 450 is transmitted to output shaft 832 by sun gear 486 and carrier 492. Rotational mechanical energy is transmitted to output shaft 834 by sun gear 486, planetary gears 490, ring gear 488, gear 472, sun gear 1127, planetary gear 1129, ring gear 1125, output shaft 841 and drive train 842.

In a high-speed mode, clutch 446 is further engaged. Clutch 1198 remains engaged, while clutches 1200 and 456 remain disengaged. As a result, rotational mechanical energy from prime mover 121 is transmitted to output shaft 834 across drive train 842 and to output shaft 832 across ring gear 1125, planetary gears 1129, sun gear 1127, gear 472 and distribution system 452.

Figure 13:
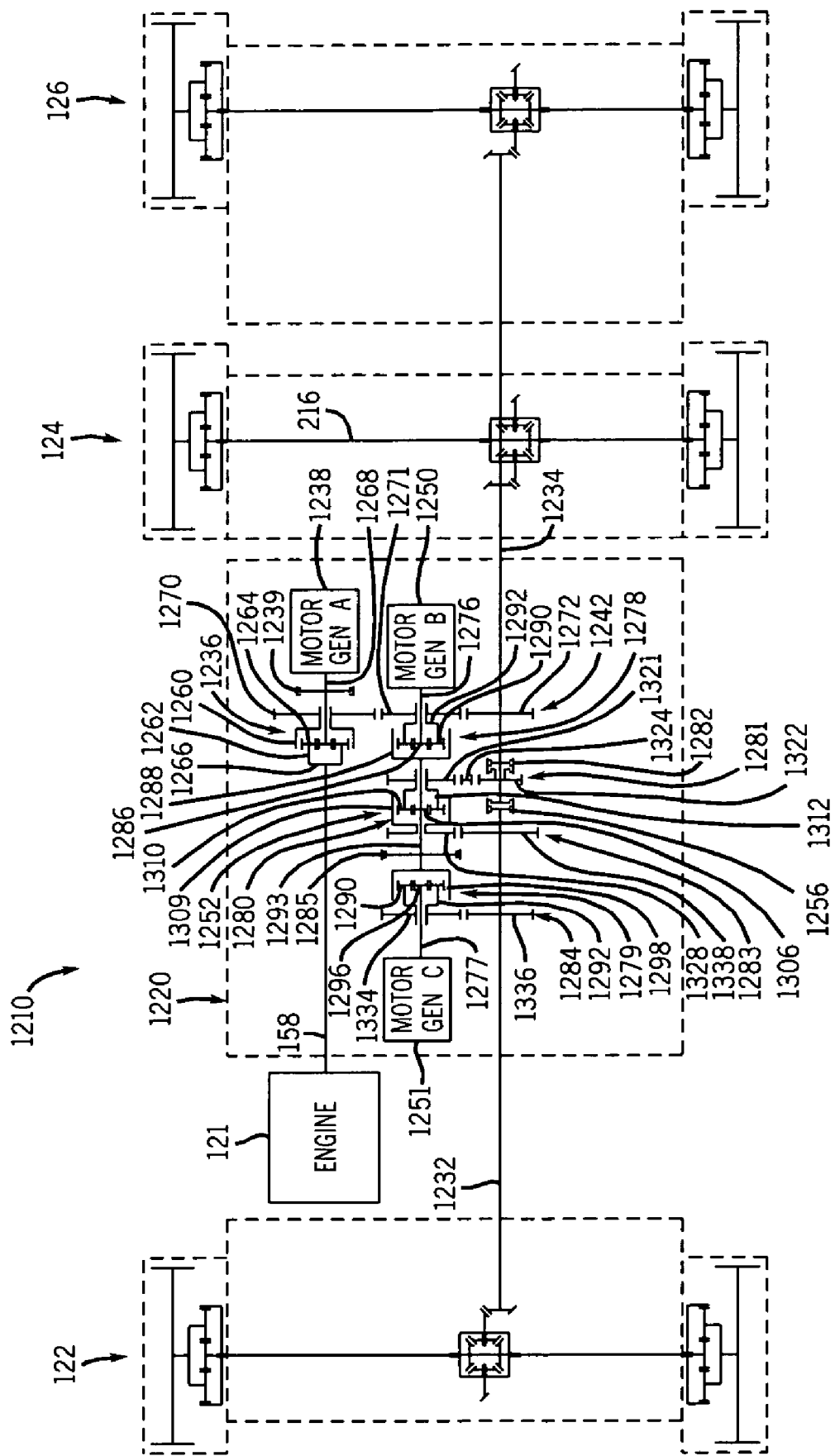
FIG. 13 is a schematic illustration of a vehicle including a seventh alternative embodiment of the vehicle of FIG. 1.

FIG. 13 illustrates vehicle 1210, an alternative embodiment of vehicle 110. Vehicle 1210 is substantially identical to vehicle 110 except that 1210 includes drive system 1220. Drive system 1220 includes output shaft 1232, output shaft 1234, planetary gear assembly 1236, motor/generator 1238, clutch 1239, drive train 1242, prime mover 1250, prime mover 1251, distribution system 1252 and clutch 1256. Planetary gear assembly 1236 is coupled to prime mover output shaft 158, drive train 1242 and motor/generator 1238. Planetary gear assembly 1236 includes ring gear 1260, sun gear 1262, planetary gears 1264 and carrier 1266. Ring gear 1260 is affixed to drive train 1242. Sun gear 1262 is secured to motor/generator 1238. Planetary gears 1264 are intermeshing engagement with ring gear 1260 and sun gear 1262 and are rotatably supported by carrier 1266 which is affixed to prime mover output shaft 158.

Motor/generator 1238 generally comprises a conventionally known or future developed AC or variable frequency drive motor. Motor/generator 1238 has an input/output shaft 1268 coupled to sun gear 1262. Motor/generator 1238 operates in a first state in which it generates electrical power upon being driven by prime mover 121 and a second state in which it provides rotational mechanical energy to shaft 1268 to rotatably drive shaft 1268.

Clutch 1239 is configured to selectively couple input/output shaft 1268 to ground to prevent rotation of shaft 1268. When clutch 1268 is in an engaged or actuated state, rotational mechanical energy or torque from prime mover 121 is entirely transmitted to drive train 1242. When clutch 1239 is in the disengaged or unactuated state, rotational mechanical energy from prime mover 121 is transmitted to motor/generator 1238 such that motor/generator 1238 functions as a generator or, depending upon the established frequency of motor/generator 1238, is combined with the rotational mechanical energy provided by motor/generator 1238 (functioning as a motor) to drive drive train 1242.

Drive train 1242 couples ring gear 1260 to output shaft 1234 and to distribution system 1252. In the particular embodiment illustrated, drive train 1242 includes intermeshing gears 1270, 1271 and 1272. In lieu of comprising intermeshing gears, drive train 1242 may comprise other torque transmitting trains such as belt and pulley arrangements or chain and sprocket arrangements.

Prime mover 1250 generally comprises an electric motor/generator configured to provide rotational mechanical energy as an output via output shaft 1276 to distribution system 1252. Similarly, prime mover 1251 comprises an electric motor/generator configured to provide rotational mechanical energy as an output via output shaft 1277. In alternative embodiments, one or both of prime movers 1250, 1251 may alternatively comprise electric motors which do not also function as a generator.

Distribution system 1252 distributes torque or force from one or both of prime movers 1250 and 1251 to output shafts 132, 134 while reducing the speed (increasing the torque) of the force being transmitted to one or both of shafts 1232, 1234. Distribution system 1252 generally includes planetary gear assembly 1278, planetary gear assembly 1279, planetary gear assembly 1280, drive train 1281, clutch 1282, drive train 1283, drive train 1284 and clutch 1285. Planetary gear assembly 1278 includes sun gear 1286, ring gear 1288, planetary gears 1290 and carrier 1292. Sun gear 1286 is affixed to prime mover output shaft 1276. Ring gear 1288 is affixed to drive shaft 1293 and is in meshing engagement with planetary gears 1290. Planetary gears 1290 are rotatably supported by carrier 1292 and are in meshing engagement with sun gear 1286 and ring gear 1288. Carrier 1292 is affixed to gear 1271 of drive train 1242.

Planetary gear assembly 1279 includes sun gear 1296, ring gear 1298, planetary gears 1290 and carrier 1292. Sun gear 1296 is affixed to prime mover output shaft 1277. Ring gear 1288 is affixed to drive shaft 1293. Planetary gears 1290 are rotatably supported by carrier 1292 in intermeshing engagement with sun gear 1296 and ring gear 1298. Carrier 1292 is affixed to drive train 1284.

Planetary gear assembly 1280 includes sun gear 1396, ring gear 1398, planetary gears 1390 and carrier 1392. Sun gear 1396 is affixed to drive shaft 1293. Ring gear 1398 is affixed to drive train 1283. Planetary gears 1390 are rotatably supported by carrier 1392 in intermeshing engagement with sun gear 1396 and ring gear 1398. Carrier 1392 is affixed to drive train 1281.

Drive train is coupled between carrier 1392 and output shaft 1234 so as to transmit rotational mechanical energy therebetween. In the particular embodiment illustrated, drive train 1281 includes gears 1321, 1322 and 1324. Gear 1321 is affixed to carrier 1312. Gear 1322 is configured to be selectively coupled to output shaft 1234 by clutch 1282. Gear 1324 is in intermeshing engagement with gears 1321 and 1322. Although gear 1322 is illustrated as being configured to be selectively coupled to output shaft 1234 by clutch 1282, other arrangements may be employed to selectively couple carrier 1312 to output shaft 1234. For example, clutch 1282 may alternatively be configured to selectively couple gear 1321 to carrier 1312. Although drive train 1281 is illustrated as comprising three gears, drive train 1281 may alternatively comprise greater or fewer gears or may employ other drive train mechanisms such as belt and pulley arrangements or chain and sprocket arrangements.

Drive train 1283 is coupled between ring gear 1308 and output shaft 1232. Drive train 1283 includes gears 1328 and 1330. Gear 1328 is affixed to ring gear 1308 while gear 1330 is affixed to output shaft 11232. Other drive train mechanisms may be employed in lieu of the two gears shown.

Drive train 1284 is coupled between carrier 1292 and output shaft 1232. Drive train 1284 includes gears 1334, 1336. Gear 1334 is affixed to carrier 1292 while gear 1336 is affixed to output shaft 1232. In alternative embodiments, other drive train mechanisms may be employed in lieu of the two gears shown.

Clutch 1285 is configured to selectively couple drive shaft 1293 to ground to prevent rotation of drive shaft 1293.

Figure 14:
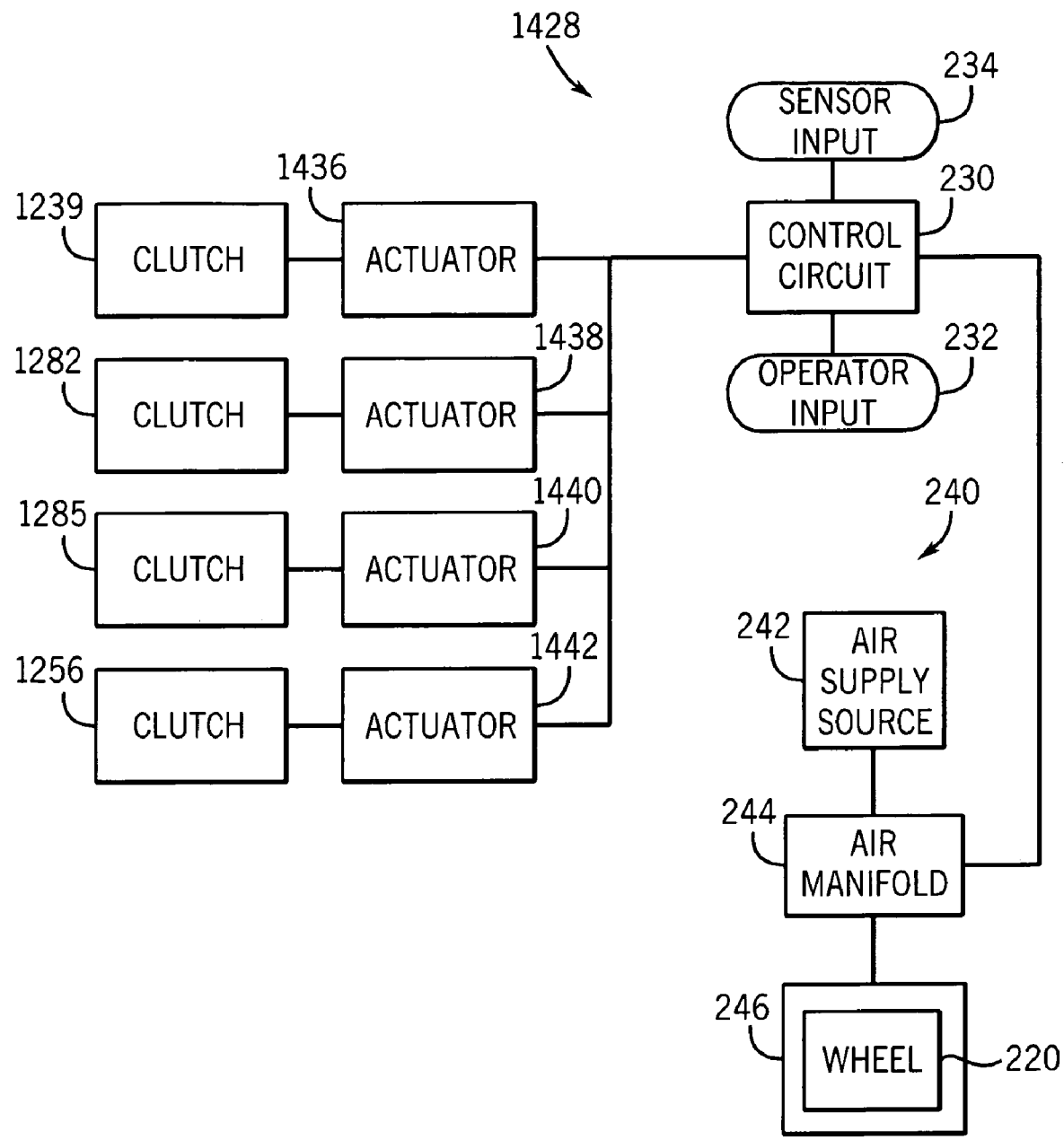
FIG. 14 is a schematic illustration of a control system of the vehicle of FIG. 13.

FIG. 14 illustrates control system 1428 of vehicle 1210. Control system 1428 is similar to control system 128 of vehicle 110 except that control system 1428 includes actuators 1436, 1438, 1440 and 1442 in lieu of actuators 136, 138, 140 and 142, respectively. For ease of discussion, those remaining elements of control system 1428 which correspond to similar elements of control system 128 are numbered similarly. Like vehicle 110, vehicle 1210 operates in three main drive modes or speed ranges: a low-speed range, a mid-speed range and a high-speed range. In the low-speed range, control circuit 230 generates control signals such that actuator 438 moves clutch 1282 to an actuated or engaged state and such that actuators 436, 440 and 442 move or maintain clutches 1239, 1285 and 1256 in unactuated or disengaged states. As a result, the rotational mechanical energy provided by prime mover 121 is transmitted to shaft 1268 to rotatably drive shaft 1268 in a direction opposite to the normal direction of motor/generator 1238, causing motor/generator 1238 to function as a generator. The electricity produced by motor 1238 is stored, utilized by other portions of vehicle 1210 or is provided to one or both of prime movers 1250, 1251 to power prime mover 1250 and/or 1251 in applications where prime mover 1250 or 1251 comprises an electric motor or other electrically driven prime mover.

In the low-speed mode, prime mover 1250 generates rotational mechanical energy which is transmitted through planetary gear assembly 1278 to drive shaft 1293 and through planetary gear assembly 1280 and drive train 1281 to output shaft 1234. Rotational mechanical energy from prime mover 1250 is further transmitted through planetary gear assembly 1278 and through drive train 1242 to output shaft 1234. Rotational mechanical energy from prime mover 1250 is further transmitted to output shaft 1232 through planetary gear assembly 1278, through drive shaft 1293 and through drive train 1283 coupled between output shaft 1232 and ring gear 1308 of planetary gear assembly 1280.

Additional rotational mechanical energy may be provided to both output shafts 1232 and 1234 by motor/generator 1251. In particular, rotational mechanical energy generated by motor/generator 1251 (functioning as a motor) is transmitted to output shaft 1232 through drive train 1284 coupled to carrier 1292 of planetary gear assembly 1279. Rotational mechanical energy from prime mover 1251 is further transmitted to output shaft 1232 through planetary gear assembly 1279, through drive shaft 1293 and through drive train 1283 which is coupled to ring gear 1308 of planetary gear assembly 1280. The rotational mechanical energy from prime mover 1251 is further transmitted to output shaft 1234 through planetary gear assembly 1279, through drive shaft 1293 and through drive train 1281 which is coupled to carrier 1312 of planetary gear assembly 1280.

When vehicle 1210 is in the low-speed mode, planetary gear assembly 1280 functions as a speed reducer so as to differentiate the rotational mechanical energy being transmitted to output shafts 1232 and 1234 by prime movers 1250 and 1251. The amount of rotational mechanical energy or torque transmitted to output shaft 1232 and 1234 may be precisely controlled by varying the output of prime movers 1250 and 1251 to attain the desired ratio depending upon the characteristics of vehicle 1210. In the particular embodiment illustrated, prime movers 1250 and 1251 are substantially identical to one another and are generally operated to provide the same output, wherein reduction unit 1252 reduces the speed and splits the power from prime movers 1250 and 1251 such that drive 122 receives 30% of the total torque generated by prime movers 1250 and 1251 while rear drives 124 and 126 receive 70% of the total torque generated by prime movers 1250 and 1251. This ratio generally corresponds with the apportionment of weight between the front axle or drive 122 and the rear axles 124, 126.

In the mid-speed range, control circuit 230 generates control signals such that actuator 1438 moves clutch 1282 to the disengaged or unactuated state while actuator 1440 moves clutch 1285 to the actuated or engaged state. Clutches 1239 and 1256 remain in the unactuated or disengaged state. As a result, rotational mechanical energy provided by prime mover 121 is split between motor/generator 1238 and output shaft 1234. In particular, rotational mechanical energy from prime mover 121 is transmitted to shaft 1268 through planetary gear assembly 1236 to drive shaft 1268 such that motor/generator 1238 functions as a generator of electrical power. Rotational mechanical energy from prime mover 121 is further transmitted through planetary gear assembly 1236 through drive train 1242 to output shaft 1234. In this mid-speed range, distribution system 1252 directly connects prime movers 1250 and 1251 to output shafts 1234 and 1232, respectively. Rotational mechanical energy generated by prime mover 1250 is transmitted to output shaft 1234 through planetary gear assembly 1278 and through drive train 1242. Rotational mechanical energy generated by prime mover 1251 is transmitted to output shaft 1232 through planetary gear assembly 1279 and drive train 1284. No torque is transmitted through planetary gear assembly 1280. In the mid-speed range, the amount of torque provided to drives 122, 124 and 126 may be varied by varying the output of prime movers 1250 and 1251, individually.

In the high-speed modes control circuit 230 generates control signals such that actuator 436 additionally moves clutch 1239 to the engaged or actuated state. As a result, shaft 1268 is retained against rotation wherein rotational mechanical energy from prime mover 121 is entirely transmitted to output shaft 1234 through planetary gear assembly 1236 and through drive train 1242. Additional torque may be provided by prime mover 1250. Rotational mechanical energy to front drive 122, if any, is provided by prime mover 1251 through planetary gear assembly 1279 and through drive train 1284.

In the high-speed mode, rotational mechanical energy from prime mover 121 is transmitted to shaft 1276 so as to rotate shaft 1276 in a direction such that prime mover 1250 functions as a generator to generate electrical power. This electrical power may be used to power prime mover 1251 for driving drive 122 or may be used to power other electrically run devices of vehicle 1210. In still other applications, clutch 1239 is disengaged wherein electrical power generated by prime mover 1250 is used to drive motor/generator 1238. As a result, prime mover 121 and motor/generator 1238 produce rotational mechanical energy which is transmitted to output shaft 1234 through drive train 1242. The extra rotational mechanical energy provided by motor/generator 1238 provides an overdrive. In other applications, the electrical power utilized to drive motor/generator 1238 (as a motor) may be provided by other sources of electrical power such as stored electrical power or another generator coupled to prime mover 121.

Like drive systems 20, 120, 320, 420, 620, 820, and 1120, drive system 1220 includes a distribution system which simultaneously serves two distinct functions: (1) splitting torque between at least two output shafts and/or at least two drive trains, and (2) providing gear or speed reduction. As a result, such drive systems potentially eliminate the need for heavier transfer cases. In contrast to drive systems 20, 120, 320, 420, 620, 820, and 1020, drive system 1220 provides additional control over the amount of torque being provided to drives 122, 124 and 126. In particular, drive system 1220 enables the torque being provided to drive 122, 124 and 126 to be precisely controlled by varying the output of prime movers 1250 and 1251. At the same time, because drive system 1220 utilizes two prime movers 1250 and 1251, prime 1250 and 1251 may be smaller or have a reduced minimal capacity as compared to prime mover 150 itself. Consequently, smaller less costly prime movers may be utilized in drive system 1220.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A vehicle comprising:
   a first prime mover;
   a first output shaft;
   a second output shaft; and
   a first planetary gear assembly including:
      a first sun gear;
      a first ring gear; and
      a first plurality of planetary gears supported between the first ring gear and the first sun gear by a first carrier, wherein one of the first sun gear and the first ring gear is coupled to the first prime mover, wherein the other of the first ring gear and the first sun gear is coupled to the first output shaft and wherein the first carrier is coupled to the second output shaft;
   a second prime mover;
   a first motor generator; and
   a second planetary gear assembly including:
      a second sun gear;
      a second ring gear; and
      a second plurality of planetary gears between the second ring gear and the second sun gear and supported by a second carrier, wherein one of the second sun gear and the second ring gear is coupled to the second prime mover, wherein the other of the second ring gear and the second sun gear is coupled to the first motor generator, and wherein the second carrier is coupled to the second output shaft.

2. The vehicle of claim 1, wherein the first carrier is selectively coupled to the second output shaft.

3. The vehicle of claim 2 including a first clutch configured to selectively couple the first carrier and the second output shaft.

4. The vehicle of claim 1 including a first clutch configured to selectively couple the first carrier and the first sun gear.

5. The vehicle of claim 1, wherein the first prime mover includes an electric motor/generator.

6. The vehicle of claim 1, wherein the first prime mover includes an internal combustion engine.

7. The vehicle of claim 1, wherein the first prime mover includes an electric motor and wherein the first motor generator supplies electric power to the first prime mover.

8. The vehicle of claim 1, wherein the second sun gear is selectively coupled to the second carrier.

9. The vehicle of claim 8 including a clutch configured to selectively couple the second sun gear to the second carrier.

10. The vehicle of claim 1, wherein the second prime mover includes an internal combustion engine.

11. The vehicle of claim 10, wherein the first prime mover includes a second electric motor.

12. The vehicle of claim 10, wherein the first prime mover includes a second electric motor/generator.

13. The vehicle of claim 1, wherein the first carrier is selectively coupled to the second output shaft.

14. The vehicle of claim 13 including a clutch configured to selectively couple the first carrier to the second output shaft.

15. The vehicle of claim 1 including a differential having a differential input coupled to the other of the first ring gear and the first sun gear, a first differential output coupled to the second output shaft and a second differential output coupled to the first output shaft.

16. The vehicle of claim 15 including a clutch configured to selectively couple the first output shaft and the second output shaft.

17. The vehicle of claim 1, wherein the first output shaft is coupled to a first wheel on a first axle and wherein the second output shaft is coupled to a second wheel on the first axle.

18. The vehicle of claim 17, wherein the first wheel includes a first wheel end reduction unit and wherein the second wheel includes a second wheel end reduction unit.

19. The vehicle of claim 1, wherein the first output shaft is coupled to a first wheel on a first axle and wherein the second output shaft is coupled to a second wheel on a second axle.

20. The vehicle of claim 19, wherein the first wheel includes a first wheel end reduction and wherein the second wheel includes a second wheel end reduction unit.

21. The vehicle of claim 1 including a generator coupled to the first prime mover.

22. The vehicle of claim 1 including a power storage system coupled to the first prime mover.

23. The vehicle of claim 1 including a multi-speed transmission coupled between the first prime mover and the first output shaft.

24. The vehicle of claim 1 including a central tire inflation system including:
an air supply source;
an air manifold;
an inflatable tire coupled to the air manifold and disposed on the wheel; and
a central tire inflation system control unit configured to generate a central tire inflation system control signal, wherein the air manifold regulates the air supply to the wheel in response to the control signal.

25. The vehicle of claim 24 including a hybrid drive control unit configured to generate a hybrid drive control signal based upon torque and speed requirements of the vehicle, wherein the central tire inflation system control unit is configured to regulate tire pressure based at least in part upon the hybrid drive control signal.

26. The vehicle of claim 25, wherein the central tire inflation system control unit is configured to generate a signal to optimize tire pressure based upon the hybrid drive signal and a user supply input.

27. The vehicle of claim 1 including a hybrid drive control unit configured to generate a hybrid drive control signal based upon torque and speed requirements of the vehicle.

28. The vehicle of claim 27, wherein the hybrid drive control unit is configured to generate a signal during a turning operation to increase power supplied to a ground motive member located on an outside of a turning radius of the vehicle.

29. The vehicle of claim 1, wherein the vehicle includes a front axle and at least one rear axle, wherein the first output shaft transmits rotational mechanical energy to the front axle and wherein the second output shaft transmits rotational mechanical energy to the at least one rear axle.

30. The vehicle of claim 1, wherein the vehicle includes a front axle, a first rear axle and a second rear axle, wherein the first output shaft transmits rotational mechanical energy to the first rear axle and wherein the second output shaft transmits rotational mechanical energy to the second rear axle.

31. The vehicle of claim 30 wherein the second prime mover is coupled to the front axle and wherein the first prime mover supplies rotational mechanical energy to the front axle.

32. The vehicle of claim 31, wherein the second prime mover comprises an electric motor.

33. The vehicle of claim 31 including:
a clutch configured to selectively couple the second sun gear to the second ring gear.

34. The vehicle of claim 1 including:
a front axle;
a first rear axle; and
a second rear axle, wherein the first output shaft is coupled to the front axle, wherein the second output shaft is coupled to the first rear axle and the second axle, wherein approximately 30% of power generated by the first prime mover is transmitted to the first output shaft and wherein approximately 70% of the power generated by the first prime mover is transmitted to the second output shaft.

35. The vehicle of claim 1 including:
a front axle;
a first rear axle; and
a second rear axle, wherein the first output shaft is coupled to the front axle, wherein the second output shaft is coupled to the first rear axle and the second axle, wherein approximately 30% of power generated by the first prime mover is transmitted to the first output shaft and wherein approximately 50% of the power generated by the first prime mover is transmitted to the second output shaft.

36. The vehicle of claim 1 including:
a front axle; and
a plurality of rear axles, wherein the vehicle operates in a first mode in which approximately 30% of rotational mechanical energy provided by the first prime mover is transmitted to the front axle and in which approximately 70% of the rotational mechanical energy generated by the first prime mover is transmitted to the plurality of rear axles and a second mode in which approximately 50% of the rotational mechanical energy generated by the first prime mover is transmitted to the front axle and in which approximately 50% of the rotational mechanical energy generated by the first prime mover is transmitted to the plurality of rear axles.

37. The vehicle of claim 1 including:
a third output shaft;
wherein the second sun gear is coupled to the second prime mover and wherein the second carrier is coupled to the third output shaft; and
a clutch configured to move between a first position in which the clutch secures the second ring gear against rotation and a second position in which the clutch couples the second ring gear to the second sun gear.

38. The vehicle of claim 37, wherein the vehicle includes:
a front axle;
a first rear axle; and
a second rear axle, wherein the first output shaft is coupled to the first rear axle, wherein the second output shaft is coupled to the second rear axle and wherein the third output shaft is coupled to the front axle.

39. The vehicle of claim 1 including:
a drive shaft coupled to the second prime mover; and
a first drive train coupled between the first drive shaft and the second ring gear;
a second drive shaft;
a second drive train coupled between the second carrier and the second drive shaft, wherein the second carrier is coupled to the output shaft;
a third planetary gear assembly including a third sun gear;
a third ring gear; and a third plurality of planetary gears supported between the third ring gear and the third sun gear by a third carrier, wherein the third ring gear is affixed to the second drive shaft;
a third drive train coupled between the third sun gear and the first ring gear; and
a first clutch configured to selectively couple the third carrier to the third drive train.

40. The vehicle of claim 39, wherein at least one of the first ring gear and the second ring gear is configured to be selectively coupled against rotation.

41. The vehicle of claim 39 including a second clutch configured to selectively couple the third carrier against rotation.

42. The vehicle of claim 41 including a third clutch configured to selectively couple the first drive shaft directly to the second drive shaft.

43. The vehicle of claim 42 including a fourth drive train selectively coupled between the second drive shaft and the first output shaft.

44. A vehicle comprising:
a first prime mover;
a first output shaft;
a second output shaft; and
a first planetary gear assembly including:
    a first sun gear;
    a first ring gear; and
    a first plurality of planetary gears supported between the first ring gear and the first sun gear by a first carrier, wherein one of the first sun gear and the first ring gear is coupled to the first prime mover, wherein the other of the first ring gear and the first sun gear is coupled to the first output shaft and wherein the first carrier is coupled to the second output shaft;
a second prime mover;
a first motor generator;
a second planetary gear assembly including:
    a second sun gear;
    a second ring gear; and
    a second plurality of planetary gears between the second ring gear and the second sun gear and supported by a second carrier, wherein the carrier is coupled to the second prime mover, wherein the sun gear is coupled to the first motor/generator; and
a first drive train coupled to the second ring gear, the first carrier and the second output shaft.

45. The vehicle of claim 38 including:
a drive shaft affixed to the first ring gear;
a third planetary gear assembly including:
    a third sun gear;
    a third ring gear and third plurality of planetary gears between the third ring gear and the third sun gear and supported by a third carrier, wherein the third sun gear is affixed to the drive shaft;
    a second drive train coupled to the third carrier and selectively coupled to the second output shaft; and
    a fourth drive train coupled to the third ring gear and the first output shaft.

46. The vehicle of claim 45 including:
a third prime mover;
a fourth planetary gear assembly including:
    a fourth sun gear;
    a fourth ring gear; and
    a fourth plurality of planetary gears between the fourth ring gear and the fourth sun gear and supported by a fourth carrier, wherein the fourth sun gear is coupled to the third prime mover, wherein the fourth ring gear is coupled to the drive shaft;
a fourth drive train coupled to the fourth carrier and the first output shaft.

47. The vehicle of claim 46 including a clutch configured to selectively couple to the drive shaft against rotation.

48. The vehicle of claim 47 including a second clutch configured to selectively couple the second sun gear against rotation.

49. The vehicle of claim 44 including:
a drive shaft affixed to the second ring gear;
a third planetary gear assembly including:
    a third sun gear;
    a third ring gear; and
    a third plurality of planetary gears between the third ring gear and the third sun gear and supported by a third carrier, wherein the third sun gear is affixed to the drive shaft;
a second drive train coupled to the third ring gear and to the first output shaft.

50. The vehicle of claim 49 including:
a third prime mover;
a fourth planetary gear assembly including:
    a fourth sun gear;
    a fourth ring gear; and
    a fourth plurality of planetary gears between the fourth sun gear and the fourth ring gear and supported by a fourth carrier, wherein the fourth sun gear is coupled to the third prime mover and wherein the fourth ring gear is affixed to the drive shaft; and
a third drive train coupled to the fourth carrier and the first output shaft.

51. The vehicle of claim 50 including a clutch configured to selectively couple the drive shaft against rotation.

52. The vehicle of claim 51 including a second clutch configured to selectively couple the second sun gear against rotation.

53. The vehicle of claim 44 including a clutch configured to selectively couple the first output shaft to the second output shaft.

54. The vehicle of claim 1 including:
A vehicle comprising:
a first prime mover;
a first output shaft;
a second output shaft; and a first planetary gear assembly including:
    a first sun gear;
    a first ring gear; and
    a first plurality of planetary gears supported between the first ring gear and the first sun gear by a first carrier, wherein one of the first sun gear and the first ring gear is coupled to the first prime mover, wherein the other of the first ring gear and the first sun gear is coupled to the first output shaft and wherein the first carrier is coupled to the second output shaft;
a second prime mover;
a first motor/generator;
a second planetary gear assembly including:
    a second sun gear;
    a second ring gear; and
    a second plurality of planetary gears supported between the second ring gear and the second sun gear by a second carrier, wherein the second sun gear is coupled to the first motor/generator;
a first drive train coupled to the second prime mover and the second ring gear; and a second drive train selectively coupled between the second carrier and the first ring gear, wherein the second carrier is coupled to the first output shaft.

55. The vehicle of claim 54 including a third drive train selectively coupled between the second carrier and the first ring gear, wherein the first drive train has a first speed reduction and wherein the second drive train has a second different speed reduction.

56. The vehicle of claim 55, wherein the third drive train is selectively coupled to the second prime mover.

57. The vehicle of claim 54 including a drive train selectively coupling the first output shaft to the second output shaft.

58. A drive system comprising:
a first prime mover;
a first output shaft;
a second output shaft; and
a first planetary gear assembly including:
a first sun gear;
a first ring gear; and
a first plurality of planetary gears supported between the first ring gear and the first sun gear by a first carrier, wherein one of the first sun gear and the first ring gear is coupled to the first prime mover, wherein the other of the first ring gear and the first sun gear is coupled to the first output shaft and wherein the first carrier is coupled to the second output shaft;
a second prime mover;
a first motor generator; and
a second planetary gear assembly including:
a second sun gear;
a second ring gear; and
a second plurality of planetary gears between the second ring gear and the second sun gear and supported by a second carrier, wherein one of the second sun gear and the second ring gear is coupled to the second prime mover, wherein the other of the second ring gear and the second sun gear is coupled to the first motor generator, and wherein the second carrier is coupled to the second output shaft.

59. The drive system of claim 58, wherein the first carrier is selectively coupled to the second output shaft.

60. The drive system of claim 59 including a first clutch configured to selectively couple the first carrier and the second output shaft.

61. The drive system of claim 58 including a first clutch configured to selectively couple the first carrier and the first sun gear.

62. The drive system of claim 58, wherein the first prime mover includes an electric motor/generator.

63. The drive system of claim 58, wherein the first prime mover includes an internal combustion engine.

64. The drive system of claim 58, wherein the first prime mover includes an electric motor and wherein the first electric motor/generator supplies electric power to the first prime mover.

65. The drive system of claim 58, wherein the second sun gear is selectively coupled to the second carrier.

66. The drive system of claim 65 including a clutch configured to selectively couple the second sun gear to the second carrier.

67. The drive system of claim 58, wherein the second prime mover includes an internal combustion engine.

68. The drive system of claim 67, wherein the first prime mover includes a second electric motor/generator.

69. The drive system of claim 58, wherein the first carrier is selectively coupled to the second output shaft.

70. The drive system of claim 58 including a differential having a differential input coupled to the other of the first ring gear and the first sun gear, a first differential output coupled to the second output shaft and a second differential output coupled to the first output shaft.

71. The drive system of claim 70 including a clutch configured to selectively couple the first output shaft and the second output shaft.

72. A vehicle comprising:
an internal combustion engine;
a first motor/generator;
a second motor/generator;
at least one first axle;
a first output shaft coupled to the at least one first axle;
at least one second axle;
a second output shaft coupled to the at least one second axle;
a first planetary gear assembly including:
a first sun gear;
a first ring gear; and
a first plurality of planetary gears supported between the first ring gear and the first sun gear by a first carrier, wherein the first sun gear is coupled to the first motor/generator, wherein one of the first carrier and the first ring gear is coupled to the engine;
a drive train coupled between the second output shaft and the other of the first carrier and the first ring gear;
a second planetary gear assembly including:
a second sun gear;
a second ring gear; and
a second plurality of planetary gears supported between the second ring gear and the second sun gear by a second carrier, wherein one of the second ring gear and the second sun gear is coupled to the second motor/generator, wherein the other of the second ring gear and the second sun gear is coupled to the first output shaft and wherein the second carrier is coupled to the second output shaft.

73. The vehicle of claim 72, wherein the second carrier is configured to be selectively coupled to the second output shaft and wherein the second carrier is configured to be selectively coupled to the second sun gear.

74. The vehicle of claim 73, wherein the first carrier is configured to be selectively coupled to the first sun gear.

75. The vehicle of claim 72 including:
a differential coupled between the first output shaft and the second output shaft; and
a drive train coupled between the second ring gear and the differential.

* * * * *